(12) United States Patent
Fujino

(10) Patent No.: US 8,861,720 B2
(45) Date of Patent: Oct. 14, 2014

(54) TAMPER-RESISTANT MEMORY INTEGRATED CIRCUIT AND ENCRYPTION CIRCUIT USING SAME

(75) Inventor: Takeshi Fujino, Kusatsu (JP)

(73) Assignee: The Ritsumeikan Trust, Kyoto (JP)

( * ) Notice: Subject to any disclaimer, the term of this patent is extended or adjusted under 35 U.S.C. 154(b) by 0 days.

(21) Appl. No.: 13/812,628

(22) PCT Filed: Jul. 28, 2010

(86) PCT No.: PCT/JP2010/062689
§ 371 (c)(1),
(2), (4) Date: Jan. 28, 2013

(87) PCT Pub. No.: WO2012/014291
PCT Pub. Date: Feb. 2, 2012

(65) Prior Publication Data
US 2013/0129083 A1 May 23, 2013

(51) Int. Cl.
H04L 9/06 (2006.01)
G11C 7/12 (2006.01)
H04L 9/28 (2006.01)
H04L 9/00 (2006.01)
G11C 7/24 (2006.01)
G11C 8/08 (2006.01)
G06F 7/58 (2006.01)

(52) U.S. Cl.
CPC .. *G11C 8/08* (2013.01); *G11C 7/12* (2013.01); *H04L 9/0618* (2013.01); *H04L 9/28* (2013.01); *H04L 9/003* (2013.01); *G11C 7/24* (2013.01); *H04L 2209/127* (2013.01); *G06F 7/584* (2013.01)

USPC .......................................................... 380/29

(58) Field of Classification Search
USPC ............................................................ 380/29
See application file for complete search history.

(56) References Cited

U.S. PATENT DOCUMENTS

| | | | |
|---|---|---|---|
| 4,984,204 A | 1/1991 | Sato et al. | |
| 5,053,652 A | 10/1991 | Sato et al. | |
| 6,940,975 B1 | 9/2005 | Kawamura et al. | |
| 2008/0021940 A1 | 1/2008 | Suzuki et al. | |
| 2009/0323942 A1* | 12/2009 | Sharon et al. | 380/44 |

FOREIGN PATENT DOCUMENTS

| | | |
|---|---|---|
| JP | 2-50396 | 2/1990 |
| JP | 2000-66585 | 3/2000 |
| JP | 2002-519722 | 7/2002 |
| WO | 99/67919 | 12/1999 |
| WO | 2006/006199 | 1/2006 |

OTHER PUBLICATIONS

International Search Report issued Oct. 26, 2010 in International (PCT) Application No. PCT/JP2010/062689.

(Continued)

*Primary Examiner* — Tu Nguyen
(74) *Attorney, Agent, or Firm* — Wenderoth, Lind & Ponack, L.L.P.

(57) ABSTRACT

An integrated memory circuit applies to an S-box of a cryptographic circuit. The integrated memory circuit includes a row decoder, a column decoder, and a sense amplifier composed of a domino-RSL circuit, wherein data reading and data writing from/to memory cells of a memory cell array are performed via two complementary bit lines, and the transition probability of a signal line is equalized by input of random-number data supplied from a random-number generating circuit using an arbiter circuit.

17 Claims, 28 Drawing Sheets

(a)

(b)

(56) References Cited

OTHER PUBLICATIONS

Kenji Kojima et al., "The implementation of DES cryptographic circuit and the evaluation of DPA attack resistance using Domino-RSL technique", The Institute of Electronics, Information and Communication Engineers, IEICE Technical Report, VLD2008-140 (Mar. 2009), Mar. 4, 2009, vol. 108, No. 478, pp. 83-88 (along with English Abstract).

Ritsumeikan University, National Institute of Advanced Industrial Science and Technology, Chuo University, Meijo University, "Tai Temper Dependable VLSI System no Kaihatsu Hyoka —Jin'iteki Kogeki ni yoru Naibu Kimitsu Joho no Roei Fukusei o Boshi sum VLSI no Jitsugen-", Heisei 22 Nendo Dai 1 Kai Ryoiki Kaigi Shiryo, [online], 6, 2010, [Heisei 22 Nen 10 Gatsu 12 Nichi], Internet.

G. Edward Suh et al., "Physical Unclonable Functions for Device Authentication and Secret Key Generation", Proceedings of the 44th IEEE annual Design Automation Conference, 6, 2007, pp. 9-14, [retrieval date: Heisei 22 Nen 10 Gatsu 12 Nichi], Internet.

Yasuyuki Sakai et al., "Kiki Sekkei no Otoshiana Genjitsu no Kyoi 'Side Channel Kaiseki', (Shu) Kaiseki no Mechanism o Model-ka shi, Himitsu Joho no More o Fusegu", Nikkei Electronics, Aug. 15, 2005, No. 906, pp. 131-139.

Daisuke Suzuki et al., "Countermeasure against DPA Considering Transition Probabilities", IPSJ SIG Technical Report, Jul. 21, 2004, vol. 2004, No. 75, pp. 321-328 (along with English Abstract).

Paul Kocher et al., "Differential Power Analysis", Advances in Cryptography-Proceedings of CRYPTO '99, Springer-Verlag, Aug. 1999, pp. 388-397.

Kris Tiri et al., "A Logic Level Design Methodology for a Secure DPA Resistant ASIC or FPGA Implementation", Proceedings of the Design Automation and Test in Europe Conference and Exhibition, 2004, pp. 246-251.

Yoshinobu Toyoda et al., "Proposal of domino-RSL circuit which is resistant to Differential Power Analysis attack on cryptographic circuit", IEICE Technical Report, 2007, VLD2007-77 (along with English Abstract).

Kazuki Okuyama et al., "Verification of DPA resistance for cipher implementation using Domino-RSL on FPGA", SCIS2010 The 2010 Symposium on Cryptography and Information Security, Jan. 19-22, 2010, pp. 1-6 (along with English Abstract).

Jae W. Lee et al., "A Technique to Build a Secret Key in Integrated Circuits for Identification and Authentication Applications", 2004 Symposium on VLSI Circuits, pp. 176-179.

Yuki Hashimoto et al., "AES Cryptographic Circuit utilizing Dual-Rail RSL Memory Technique", SCIS2012 The 29th Symposium on Cryptography and Information Security, Jan. 30-Feb. 2, 2012, pp. 1-8 (along with English Abstract).

Anh-Tuan Hoang et al., "Intra-Masking Dual-Rail Memory on LUT Implementation for Temper-Resistant AES on FPGA", FPGA 2012 Proceedings of the ACM/SIGDA international symposium on Field Programmable Gate Arrays, pp. 1-10.

Yuuki Hashimoto et al., "AES Cryptogrphic Circuit utilizing Dual-Rail RSL Memory Technique", IEICE Technical Report, Nov. 2012, pp. 1-6 (along with English Abstract).

\* cited by examiner

Fig. 1   PRIOR ART                    PRIOR ART (a)

| A1 | B1 | A2 | B2 | F1 | F2 |
|----|----|----|----|----|----|
| 0  | 0  | 0  | 0  | 0  | 0  |
| 0  | 0  | 0  | 1  | 0  | 0  |
| 0  | 0  | 1  | 0  | 0  | 0  |
| 0  | 0  | 1  | 1  | 0  | 1  |
| 0  | 1  | 0  | 0  | 0  | 0  |
| 0  | 1  | 0  | 1  | 0  | 0  |
| 0  | 1  | 1  | 0  | 0  | 0  |
| 0  | 1  | 1  | 1  | 0  | 1  |
| 1  | 0  | 0  | 0  | 0  | 0  |
| 1  | 0  | 0  | 1  | 0  | 0  |
| 1  | 0  | 1  | 0  | 0  | 0  |
| 1  | 0  | 1  | 1  | 0  | 1  |
| 1  | 1  | 0  | 0  | 1  | 0  |
| 1  | 1  | 0  | 1  | 1  | 0  |
| 1  | 1  | 1  | 0  | 1  | 0  |
| 1  | 1  | 1  | 1  | 1  | 1  |

(b)

Fig. 2 PRIOR ART
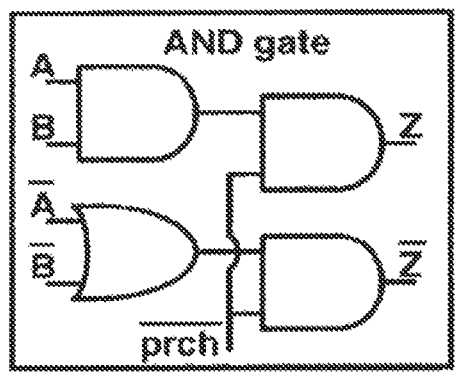
(a)
PRIOR ART
$(\overline{\overline{A \cdot B}) \cdot \overline{prch}} \leftrightarrow \overline{(\overline{A}+\overline{B}) \cdot \overline{prch}}$
| A | B | $\overline{A}$ | $\overline{B}$ | prch | Z | $\overline{Z}$ |
|---|---|---|---|---|---|---|
| 0 | 0 | 1 | 1 | 0 | 0 | 1 |
| 0 | 1 | 1 | 0 | 0 | 0 | 1 |
| 1 | 0 | 0 | 1 | 0 | 0 | 1 |
| 1 | 1 | 0 | 0 | 0 | 1 | 0 |
| X | X | X | X | 1 | 0 | 0 |
(b)
Fig. 3 PRIOR ART
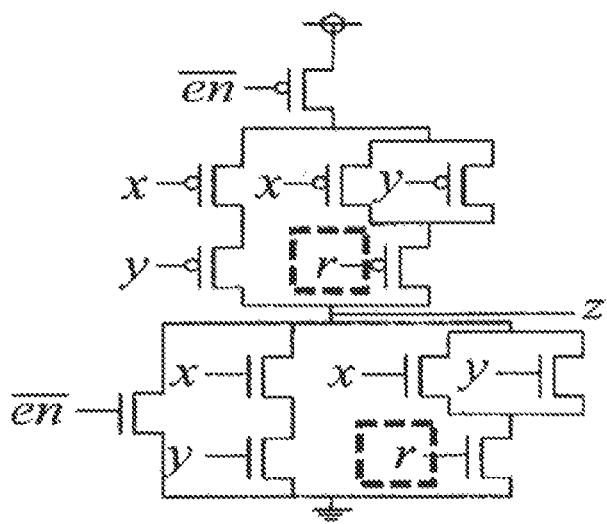
(a)
PRIOR ART
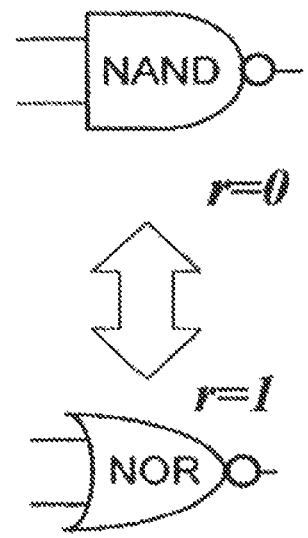
(b)

Fig. 6   PRIOR ART
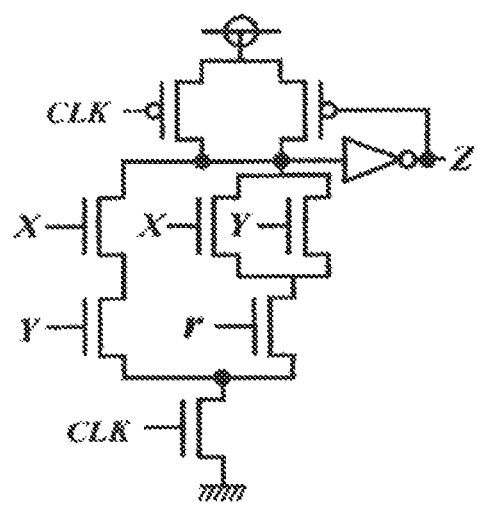
(a)
PRIOR ART
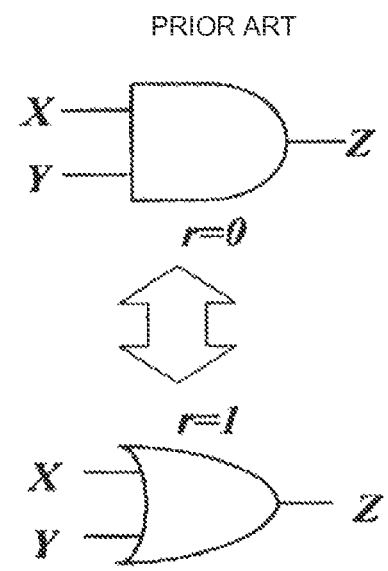
(b)

Fig. 21
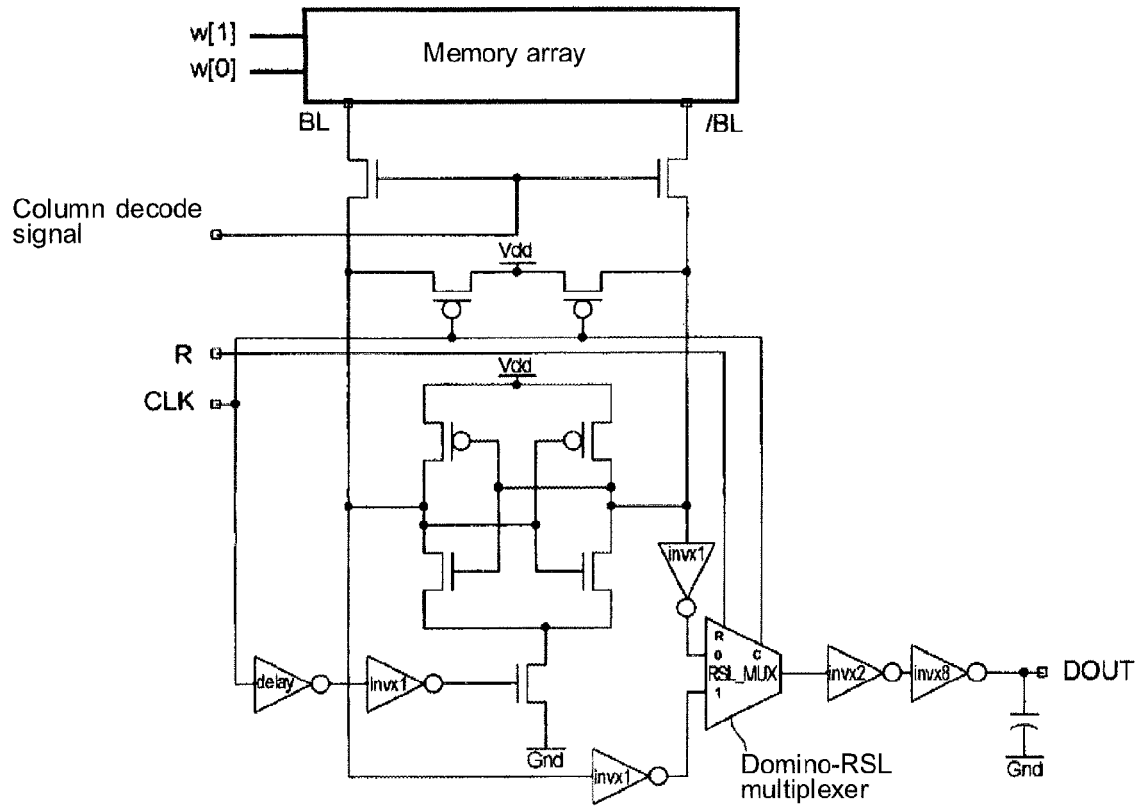
(a)
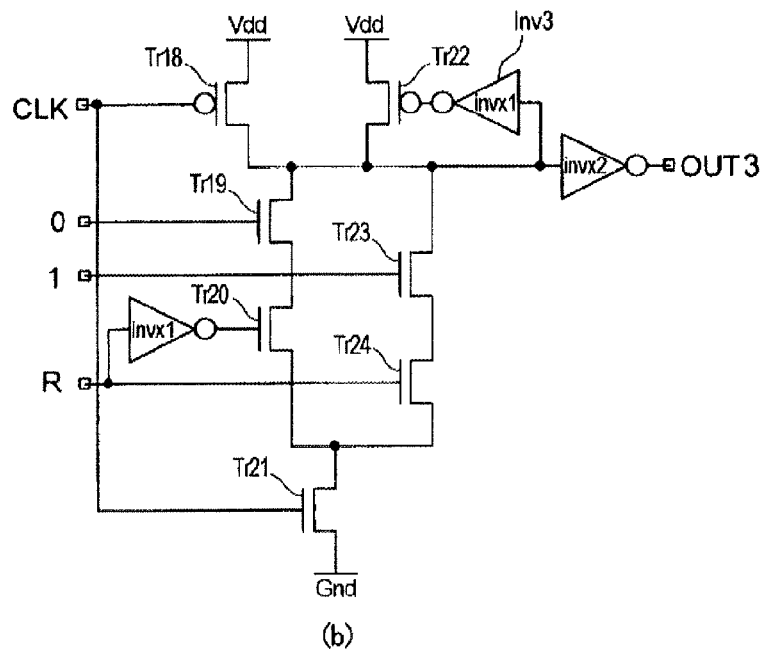
(b)

Challenge

Response

Arbiter circuit

R 16 stages

TAMPER-RESISTANT MEMORY INTEGRATED CIRCUIT AND ENCRYPTION CIRCUIT USING SAME

BACKGROUND OF INVENTION

1. Technical Field

The present invention relates to a semiconductor device for implementing a cryptographic algorithm. In particular, the present invention relates to a tamper-resistant integrated memory circuit equipped with a countermeasure against attacks for exploiting secret information (mainly cryptographic keys) processed by a semiconductor device, by using side channel information such as power consumption of the semiconductor device or radiated electromagnetic waves dependent on the power consumption. The present invention also relates to a cryptographic circuit using the tamper-resistant integrated memory circuit.

2. Background Art

In recent years, a system (e.g., an IC card) for storing financial information or personal information by using an LSI has become widely popular, and the importance of ensuring the reliability and security of such a security LSI is significantly increasing. In the security LSI, confidential information is protected by using a cryptographic circuit included therein; thus, leakage of information of the cryptographic key must be prevented. Modern cryptographic algorithm such as 3DES (Triple Data Encryption Standard) or AES (Advanced Encryption Standard) ensures high security in which a cryptographic key cannot be identified within a realistic time even by using the fastest computer with a pair of plaintext and ciphertext (input and output).

As another method for exploiting a cryptographic key, a method in which a cryptographic key is identified by using side channel information such as power consumption of a semiconductor device during execution of a cryptographic algorithm or radiated electromagnetic waves dependent on the power consumption can be a threat. As one of such side channel attacks, P. Kocher reported the "differential power attack" (DPA: differential power analysis) in 1999. The attack is disclosed in Non-patent Literature 1 (Paul Kocher, Joshua Jaffe, and Benjamin Jun, "Differential Power Analysis", Advances in Cryptography-Proceedings of CRYPTO '99, Springer-Verlag, August 1999, pp. 388-397) below and is so far considered to be the most powerful attack. This method relies on the fact that there is a correlation between a signal value or signal transition probability and power consumption during operation of a cryptographic device. This theory is specifically described below using a 2-input AND gate shown in FIG. 1(a). Assuming that the inputs of the 2-input AND gate are written as A1 and B1 before the transition, and as A2 and B2 after the transition, the transition of the inputs has 16 combinations as shown in FIG. 1(b). Assuming that the state of the input (A1) of the terminal A before the transition denotes confidential information (indicated as "target bit") and that the terminal B randomly changes, the output transition probability is $2/8=1/4$ when A1=0 (see the upper 8 rows in FIG. 1(b)), whereas the output transition probability is $4/8=1/2$ when A1=1 (see the lower 8 rows in FIG. 1(b)). The shaded portions in FIG. 1(b) indicate cases of output transitions. As such, there is a correlation between the input of the terminal A before the transition, namely, data of A1, and power consumption. In the cryptographic device, cryptographic key data, which is confidential information, is transmitted as an electric signal within the device; thus, the cryptographic key as confidential information can be identified by statistically analyzing power consumption during operation of the cryptographic device. Although the above example describes the AND gate, the same DPA attack is possible on an OR gate, NAND, or NOR gate insofar as the gate is a nonlinear gate.

As a countermeasure against such a DPA attack, a method that eliminates the correlation between an electric signal value of the cryptographic device and cryptographic information was first proposed. Then, another method that causes the device to consume constant power regardless of the signal value of the cryptographic device was proposed.

As an example of the first of the two countermeasure methods above, Patent Literature 1 (Japanese Unexamined Patent Publication No. 2000-066585) discloses a method based on a common key block encryption DES. In the method, an input value of a substitution table that is called an S-box used for the algorithm is changed by using a random-number parameter R under certain rules. In this method, in order to obtain the same output operation result as in a normal algorithm despite the input change, operations are performed using a different S-box substitution table for each rule. Since different S-box operations are performed depending on the random number R, power consumption is varied even with the same input value and the same cryptographic key. Thus, the method prevents leakage of a correlation between a cryptographic key and power consumption. Patent Literature 2 (Japanese Unexamined Patent Publication No. 2002-519722) also discloses a similar countermeasure. This method is the same as the method in Patent Literature 1 in that another table different from the normal S-box substitution table is prepared using a random-number parameter R before the operation. These cryptographic operations disclosed in Patent Literatures 1 and 2 are generally performed by software using hardware composed of a CPU (central processing unit) and a memory accessible from the CPU, and have a drawback in that the cryptographic operation takes long compared with the later-described method using dedicated cryptographic hardware. Thus, the processing is slow in these methods.

Patent Literature 3 (International Publication WO 2006-006199) discloses an example of the second of the two countermeasure methods above. As shown in the configuration example of an S-box for DES encryption in FIGS. 12 and 13 of Patent Literature 3, an S-box table for common key encryption can be implemented by using a combinatorial logic circuit that uses negative logic and a nonlinear gate, such as an AND gate or an OR gate.

The nonlinear gate has a feature such that the output transition probability differs depending on the input data value, as described above; thus, power consumption proportional to the output transition probability also depends on the input data value. In the example of the 2-input AND gate shown in FIG. 1, the output transition probability is $1/4$ when the input A is 0, and the output transition probability is $1/2$ when the input A is 1. Thus, when the input A is fixed and the input B is randomly changed, it is possible to infer whether the input A is 1 or 0 by measuring power consumption. Therefore, when bit information related to confidential information is supplied to A, it is possible to infer the value according to the power consumption.

As a countermeasure for such equalized power consumption within the nonlinear gate, Non-patent Literature 2 (K. Tiri and Ingrid Verbauwhede, "A Logic Level Design Methodology for a Secure DPA Resistant ASIC or FPGA Implementation", Design Automation and Test in Europe Conference, pp. 246-251 (2004)) discloses a dual-rail complementary logic with precharge, which uses complementary performance gates as shown in FIG. 2(a). In this method, dual complementary signals are used as the signal to be transmitted across the logic gates. Insofar as the output nodes (to logic 0) are initialized prior to the logic operation, either of the complementary signals undergoes transition during the operation, and the transition probability of the signal line becomes constant in any operation. In a transition table shown in FIG. 2(b), the lowermost row represents initialization (/prch=0, namely, prch=1) where outputs Z and /Z are 0. The figure shows that either of the outputs Z and /Z necessarily undergoes transition after the input transition regardless of the input pattern.

However, in order to ensure constant power consumption, it is necessary to completely equalize parasitic capacitance of signal lines for transmitting the complementary signals, such as A and /A or Z and /Z. However, such equalization is not only considerably difficult in terms of LSI layout design, but also causes a practical issue since the implementation area is more than tripled by increasing the number of gates and wiring.

In contrast, the "RSL (random switching logic) gate" disclosed in Patent Literature 3 achieves equalization of power consumption by using a single-wire method in which the transition probability of the gate is equalized by a random number. FIG. 3(a) shows a NAND gate using the RSL method disclosed in Patent Literature 3. As shown in FIG. 3(b), the circuit shown in FIG. 3(a) serves as a NAND gate when a random number r is 0, and serves as a NOR gate when the random number r is 1. Prior to the operation, a /en signal is set to 1, an output z is set to 0, and precharge is performed in a similar manner to that of the aforementioned dual-rail complementary logic. Since the output transition probability of the NAND gate from the precharge state is 25%, and the output transition probability of the NOR gate from the precharge state is 75%, if the random number r changes between 1 and 0 with a probability of 50%, an output node changes with a probability of 50%. As such, the device consumes constant power regardless of the signal value of the cryptographic device. Thus, the system serves as a countermeasure against DPA. However, the system has a problem in that the desired operation result cannot be obtained. In view of this problem, as shown in FIG. 4, an EXOR operation is performed at preceding and following stages of the target combinatorial logic circuit by using the same random number r as that for the RSL method, thereby switching positive logic and negative logic in the combinatorial logic circuit; thus, the desired operation can be performed. The EXOR operation section is a linear circuit having a transition probability of 50%, which is immune to DPA attacks.

In order to obtain perfect resistance to DPA attacks, it is necessary to ensure that the logic circuit is completely hazard-free (hazard: an temporal change in signal value due to delay caused by wiring or logic elements). Therefore, the /en terminal must change from 1 to 0 after the input values of the input signals x and y are determined (see FIG. 5(a); the circuit in FIG. 5(a) is the same as in FIG. 3(a)). In addition, such transition of the /en terminal from 0 to 1 must be executed before the reception of the reset (to 0) data from the previous stage. Thus, implementation and control of an asynchronous signal circuit shown in FIG. 5(b) (denoted as the broken-line region) is required. In FIG. 5(b), TG represents a timing generator, and TC represents a timing controller. In an LSI, the driving capability of a transistor greatly changes depending on the power-supply voltage and the environmental temperature. Thus, it is difficult to equip an LSI with an asynchronous signal circuit capable of accurate timing control.

As a solution for the above problem, Non-patent Literature 3 (Yoshinobu Toyoda, Kenta Kido, Yoshiaki Shitabayashi, and Takeshi Fujino, "Proposal of domino-RSL circuit resistant to differential power analysis attack on cryptographic circuit", technical report VLD2007-77 of the Institute of Electronics, Information and Communication Engineers) discloses a domino-RSL method. FIG. 6(a) shows a domino-RSL AND/OR gate. In this method, switching between the AND gate and the OR gate is performed by using a random number r as with the RSL method (see FIG. 6(b)); thus, this method is also resistant to DPA. In addition, since this method uses a domino logic in which an output Z becomes 0 when inputs X and Y are 0, the output value changes only once and essentially no hazard occurs. Therefore, this method has a feature in that it is not necessary to control asynchronous timing of /en signals, which is difficult to implement in the RSL method. Another feature is that the method requires a fewer transistors, and therefore the implementation area per gate is smaller than with an RSL circuit. Non-patent Literature 4 (Kazuki Okuyama, Kenji Kojima, Katsuhiko Iwai, and Takeshi Fujino, "Verification of DPA resistance for cipher implementation using Domino-RSL on FPGA", the Symposium on Cryptography and Information Security (SCIS2010), January 2010) discloses DPA resistance of a DES cryptographic circuit using this domino-RSL circuit.

FIG. 7 shows a circuit block diagram of a DES cryptographic circuit using the domino-RSL method. In the circuit, the domino-RSL method is applied only to an S-box circuit that requires a nonlinear gate. The S-box circuit in the DES cryptographic circuit uses 8 kinds of tables each having 6 inputs and 4 outputs. Accordingly, the figure shows 8 kinds of S-boxes (S-box 1 to S-box 8). In each S-box, a table having 6 inputs and 4 outputs is described in a hardware description language and can be converted into a netlist including a domino-RSL gate, by using a logic synthesis tool (the SIS logic synthesis tool distributed by UC Berkley) capable of creating logic with no negative logic. In the figure, each EXOR gate $R_T$ in the circuit serves to carry out a random mask method against hamming-distance-type DPA attacks using DFF transition.

CITATION LIST

Patent Literature

PTL 1: Japanese Unexamined Patent Publication No. 2000-066585
PTL 2: Japanese Unexamined Patent Publication No. 2002-519722
PTL 3: International Publication WO 2006-006199

Non-Patent Literature

NPL 1: Paul Kocher, Joshua Jaffe, and Benjamin Jun, "Differential Power Analysis", Advances in Cryptography-Proceedings of CRYPTO '99, Springer-Verlag, August 1999, pp. 388-397
NPL 2: K. Tiri and Ingrid Verbauwhede, "A Logic Level Design Methodology for a Secure DPA Resistant ASIC or FPGA Implementation", Design Automation and Test in Europe Conference, pp. 246-251 (2004)
NPL 3: Yoshinobu Toyoda, Kenta Kido, Yoshiaki Shitabayashi, and Takeshi Fujino, "Proposal of domino-RSL circuit resistant to differential power analysis attack on cryptographic circuit", technical report VLD2007-77 of the Institute of Electronics, Information and Communication Engineers
NPL 4: Kazuki Okuyama, Kenji Kojima, Katsuhiko Iwai, and Takeshi Fujino, "Verification of DPA resistance for cipher implementation using domino-RSL on FPGA", Symposium on Cryptography and Information Security (SCIS 2010), January 2010

NPL 5: Jae W. Lee et al. "A Technique to Build a Secret Key in Integrated Circuits for Identification and Authentication Applications", 2004 Symposium on VLSI Circuits, pp. 176-179

SUMMARY OF INVENTION

Technical Problem

Under present circumstances, LSI implementation of an S-box using a domino-RSL circuit has the following three problems.

(1) The domino method requires a logic synthesis tool that does not use negative logic at stages other than the initial input stage; however, the Design Compiler from Synopsys, Inc., which is a logic synthesis tool that has become popular for practical LSI designing, is incapable of such logic synthesis.

(2) The method requires automatic placement and routing of a cell that serves as a domino-RSL gate and that is not included in a general LSI design library; thus, a tool library for this cell has to be created.

(3) The clock design is difficult because a large /CLK signal line load is required in the domino-RSL method in which each domino-RSL gate requires a /CLK signal.

An object of the present invention is to provide a tamper-resistant integrated memory circuit resistant to DPA attacks, in particular, a tamper-resistant integrated memory circuit that does not have the above problems in the ASIC design flow involving the domino-RSL gate, and thus can be simply designed. The present invention also provides a cryptographic circuit (e.g., a cryptographic circuit having a LSI-implemented S-box) using the tamper-resistant integrated memory circuit as a hardware core (hereinafter referred to as a "secure memory").

For example, a 6-input/4-output table required to implement an S-box for a DES cryptographic circuit can be created as a secure memory of $2^6 \times 4 = 256$ bits with 6-bit address lines and 4-bit data lines. In the present invention, in order to ensure DPA resistance, the peripheral circuit section of the secure memory is designed using, for example, the domino-RSL method. Therefore, the secure memory of the present invention has, as an input control line, random number R corresponding to the domino-RSL circuit, in addition to 6 address lines, 4 data lines, and a clock signal (CLK) of an ordinary memory. This is a distinct characteristic of the present invention.

Hereunder, some components have parenthetic reference numerals. These reference numerals are provided for easy understanding of the present invention, and not to limit the invention.

In order to solve the above problems, a first integrated memory circuit of the present invention is a integrated memory circuit comprising a memory cell array, a row decoder, a column decoder, a sense amplifier, and an input/output driver, wherein data reading and data writing from/to memory cells of the memory cell array is performed via two complementary bit lines (BL, /BL); and each of the row decoder, the column decoder, and the sense amplifier comprises a circuit in which transition probabilities of signal lines are equalized by random-number data (R) that is externally supplied.

A second integrated memory circuit of the present invention is structured such that, based on the first integrated memory circuit, each of the row decoder, the column decoder, and the sense amplifier comprises a domino-RSL circuit.

A third integrated memory circuit of the present invention is structured such that, based on the second integrated memory circuit, the row decoder comprises a first predecoder and a word line driver for driving word lines of the memory cells;

the first predecoder comprises a plurality of first inverters (inverter of FIG. 12(a)) for inverting a part of address-bit data, and a plurality of first domino-RSL gates (RSL_AND);

the first domino-RSL gates (RSL_AND) comprise first to eighth transistors (Tr1 to Tr8) and a second inverter (Inv1);

the first and fifth transistors are PMOS transistors;

the second to fourth and sixth to eighth transistors are NMOS transistors;

the first to fourth (Tr1 to Tr4) transistors are sequentially connected in series by connecting their sources or drains;

a power-supply voltage (Vdd) is applied to a source of the first transistor (Tr1) disposed at one end of the first to fourth transistors (Tr1 to Tr4), which are connected in series;

a ground voltage (Gnd) is applied to a source of the fourth transistor (Tr4) disposed at the other end of the first to fourth transistors (Tr1 to Tr4), which are connected in series;

a clock signal (CLK) is supplied to each gate of the first and fourth transistors;

a power-supply voltage (Vdd) is applied to a source of the fifth transistor (Tr5);

the sixth and seventh transistors (Tr6, Tr7) are connected in parallel;

a drain of the fifth transistor (Tr5) is connected to one of the connection nodes of the sixth and seventh (Tr6, Tr7) transistors;

a drain of the eighth transistor (Tr8) is connected to the other connection node of the sixth and seventh transistors (Tr6, Tr7);

a source of the eighth transistor (Tr8) is connected to a connection node of the third and fourth transistors (Tr3, Tr4);

a connection node of the first and second transistors (Tr1, Tr2) is connected to a connection node of the fifth to seventh transistors (Tr5 to Tr7), forming a first output node; the first output node is connected to a gate of the fifth transistor (Tr5) via the second inverter (Inv1), 1-bit data (A[2] to A[3]) that constitutes the address data, or output data from the first inverters is supplied to each gate of the second and sixth transistors (Tr2, Tr6);

1-bit data M[2] to A[3]) that constitutes the address data, or output data from the first inverters, which is different from the data supplied to the gates of the second and sixth transistors (Tr2, Tr6), is supplied to each gate of the third and seventh transistors (Tr3, Tr7); and the random-number data (R) or inversion data (/R) of the random-number data is supplied to a gate of the eighth transistor (Tr8).

A fourth integrated memory circuit of the present invention is structured such that, based on the second integrated memory circuit, the row decoder comprises a first predecoder, and a word line driver for driving word lines of the memory cells;

the first predecoder comprises a plurality of first inverters for inverting a part of multiple-bit data that constitutes address data, and a plurality of first domino-RSL gates (RSL_AND);

the first domino-RSL gates (RSL_AND) comprise first to eighth transistors (Tr1' to Tr8') and a second inverter (Inv1');

the first and fifth transistors are NMOS transistors;

the second to fourth transistors and the sixth to eighth transistors are PMOS transistors;

the first to fourth transistors (Tr1' to Tr4') are sequentially connected in series by connecting their sources or drains;

a ground voltage (Gnd) is applied to a source of the first transistor (Tr1') disposed at one end of the first to fourth transistors (Tr1' to Tr4'), which are connected in series;

a power-supply voltage (Vdd) is applied to a source of the fourth transistor (Tr4') disposed at the other end of the first to fourth transistors (Tr1' to Tr4'), which are connected in series;

a clock signal (CLK) is supplied to each gate of the first transistor (Tr1') and the fourth transistor (Tr4'), a ground voltage (Gnd) is applied to a source of the fifth transistor (Tr5');

the sixth and seventh (Tr6', Tr7') transistors are connected in parallel;

a drain of the fifth transistor (Tr5') is connected to one of the connection nodes of the sixth and seventh transistors (Tr6', Tr7');

a drain of the eighth transistor (Tr8') is connected to the other connection node of the sixth and seventh transistors (Tr6', Tr7');

a source of the eighth transistor (Tr8') is connected to a connection node of the third and fourth transistors (Tr3', Tr4');

a connection node of the first and second transistors (Tr1', Tr2') is connected to a connection node of the fifth to seventh transistors (Tr5' to Tr7'), forming a first output node;

the first output node is connected to a gate of the fifth transistor (Tr5') via the second inverter (Inv1');

1-bit data (A[2] to A[3]) that constitutes the address data, or output data from the first inverters is supplied to each gate of the second and sixth transistors (Tr2', Tr6');

1-bit data (A[2] to A[3]) that constitutes the address data, or output data from the first inverters, which is different from the data supplied to the gates of the second and sixth transistors (Tr2', Tr6'), is supplied to each gate of the third and seventh transistors (Tr3', Tr7'); and the random-number data (R) or inversion data (/R) of the random-number data is supplied to a gate of the eighth transistor (Tr8').

A fifth integrated memory circuit of the present invention is structured such that, based on the third or fourth integrated memory circuit, the word line driver comprises a plurality of second domino-RSL gates (RSL_WDrive);

the second domino-RSL gates (RSL_WDrive) comprise 9th to 17th transistors (Tr9 to Tr17) and a third inverter (Inv2);

the 9th and 14th transistors are PMOS transistors;

the 10th to 13th transistors and 15th to 17th transistors are NMOS transistors;

the 9th to 13th transistors (Tr9 to Tr13) are sequentially connected in series by connecting their sources or drains;

a power-supply voltage (Vdd) is applied to a source of the 9th transistor (Tr9) disposed at one end of the 9th to 13th transistors (Tr9 to Tr13), which are connected in series;

a ground voltage (Gnd) is applied to a source of the 13th transistor (Tr13) disposed at the other end of the 9th to 13th transistors (Tr9 to Tr13), which are connected in series;

a clock signal (CLK) is supplied to each gate of the 9th and 13th transistors (Tr9, Tr13);

the 14th to 17th transistors (Tr14 to Tr17) are sequentially connected in series by connecting their sources or drains;

a power-supply voltage (Vdd) is applied to a source of the 14th transistor (Tr14) disposed at one end of the 14th to 17th transistors (Tr14 to Tr17), which are connected in series;

a source of the 17th (Tr17) transistor disposed at the other end of the 14th to 17th transistors (Tr14 to Tr17), which are connected in series, is connected to a drain of the 13th transistor (Tr13);

a connection node of the 9th and 10th transistors (Tr9, Tr10) is connected to a connection node of the 14th and 15th transistors (Tr14, Tr15), forming a second output node;

the second output node is connected to a gate of the 14th transistor (Tr14) via the third inverter (Inv2);

output signals (a[0] to a[3], b[0] to b[3]) of the first domino-RSL gates are supplied to gates (IN3, IN4) of the 10th and 11th transistors (Tr10, Tr11) with no repetition;

an inversion signal (/IN3) of a signal (IN3) supplied to the gate of the 10th transistor (Tr10) is supplied to a gate of the 15th transistor (Tr15);

an inversion signal (/IN4) of a signal (IN4) supplied to the gate of the 11th transistor (Tr11) is supplied to a gate of the 16th transistor (Tr16); and the random-number data (R) or inversion data (/R) of the random-number data is supplied to each of the 12th and 17th transistors (Tr12, Tr17) with no repetition.

A sixth integrated memory circuit of the present invention is structured such that, based on the third or fourth integrated memory circuit, the word line driver comprises a plurality of second domino-RSL gates (RSL_WDrive);

the second domino-RSL gates (RSL_WDrive) comprise 9th to 17th transistors (Tr9' to Tr17') and a third inverter (Inv2');

the 9th and 14th transistors are NMOS transistors;

the 10th to 13th transistors and 15th to 17th transistors are PMOS transistors;

the 9th to 13th transistors (Tr9' to Tr13') are sequentially connected in series by connecting their sources or drains;

a ground voltage is applied to a source of the 9th transistor (Tr9') disposed at one end of the 9th to 13th transistors (Tr9' to Tr13'), which are connected in series;

a power-supply voltage is applied to a source of the 13th transistor (Tr13') disposed at the other end of the 9th to 13th transistors (Tr9' to Tr13'), which are connected in series;

a clock signal (CLK) is supplied to each gate of the 9th and 13th transistors (Tr9', Tr13');

the 14th to 17th transistors (Tr14' to Tr17') are sequentially connected in series by connecting their sources or drains;

a ground voltage is applied to a source of the 14th transistor (Tr14') disposed at one end of the 14th to 17th transistors (Tr14' to Tr17'), which are connected in series;

a source of the 17th transistor (Tr17') disposed at the other end of the 14th to 17th transistors (Tr14' to Tr17'), which are connected in series, is connected to a drain of the 13th transistor (Tr13');

a connection node of the 9th and 10th transistors (Tr9', Tr10') is connected to a connection node of the 14th and 15th transistors (Tr14', Tr15'), forming a second output node;

the second output node is connected to a gate of the 14th transistor (Tr14') via the third inverter (Inv2');

output signals (a[0] to a[3], b[0] to b[3]) of the first domino-RSL gates are supplied to gates (IN3, IN4) of the 10th and 11th transistors (Tr10', Tr11') with no repetition;

an inversion signal (/IN3) of a signal (IN3) supplied to the gate of the 10th transistor (Tr10') is supplied to a gate of the 15th transistor (Tr15');

an inversion signal (/IN4) of a signal (IN4) supplied to the gate of the 11th transistor (Tr11') is supplied to a gate of the 16th transistor (Tr16'); and the random-number data (R) or inversion data (/R) of the random-number data is supplied to each of the 12th and 17th transistors (Tr12', Tr17') with no repetition.

A seventh integrated memory circuit of the present invention is structured such that, based on any one of the third to sixth integrated memory circuits, the sense amplifier comprises a bit line precharge unit and a cross-coupled sense amplifier unit connected to the complementary bit lines (BL, /BL), and comprises a domino-RSL multiplexer (RSL_MUX);

the domino-RSL multiplexer comprises 18th to 24th transistors (Tr18 to Tr24) and a fourth inverter (Inv3');

the 18th and 22nd transistors are PMOS transistors;

the 19th to 21$^{st}$ transistors, and the 23rd and 24th transistors are NMOS transistors;

the 18th to 21st transistors (Tr18 to Tr21) are sequentially connected in series by connecting their sources or drains;

a power-supply voltage is applied to a source of the 18th transistor (Tr18) disposed at one end of the 18th to 21st transistors (Tr18 to Tr21), which are connected in series;

a ground voltage is applied to a source of the 21st transistor (Tr21) disposed at the other end of the 18th to 21st transistors (Tr18 to Tr21), which are connected in series;

a clock signal (CLK) is supplied to each gate of the 18th and 21st transistors (Tr18, Tr21), the 22nd to 24th transistors (Tr22 to Tr24) are sequentially connected in series by connecting their sources or drains;

a power-supply voltage is applied to a source of the 22nd transistor (Tr22) disposed at one end of the 22nd to 24th transistors (Tr22 to Tr24), which are connected in series;

a source of the 24th transistor (Tr24) disposed at the other end of the 22nd to 24th transistors (Tr22 to Tr24), which are connected in series, is connected to a drain of the 21st transistor (Tr21);

a connection node of the 18th and 19th transistors (Tr18, Tr19) is connected to a connection node of the 22nd and 23rd transistors (Tr22, Tr23), forming a third output node;

the third output node is connected to a gate of the 22nd transistor (Tr22) via the fourth inverter (Inv3);

signals from the complementary bit lines (BL, /BL) are supplied to each gate of the 19th and 23rd transistors (Tr19, Tr23) with no repetition; and the random-number data (R) or inversion data of the random-number data is supplied to each gate of the 20th and 24th transistors (Tr20, Tr24).

An eighth integrated memory circuit of the present invention is structured such that, based on any one of the third to sixth integrated memory circuits, the sense amplifier comprises a bit line precharge unit and a cross-coupled sense amplifier unit connected to the complementary bit lines (BL, /BL), and comprises a domino-RSL multiplexer (RSL_MUX);

the domino-RSL multiplexer (RSL_MUX) comprises 18th to 24th transistors and a fourth inverter (Inv3');

the 18th and 22nd transistors are NMOS transistors;

the 19th to 21st transistors, and the 23rd and 24th transistors are PMOS transistors;

the 18th to 21st transistors (Tr18' to Tr21') are sequentially connected in series by connecting their sources or drains;

a ground voltage is applied to a source of the 18th transistor (Tr18') disposed at one end of the 18th to 21st transistors (Tr18' to Tr21'), which are connected in series;

a power-supply voltage is applied to a source of the 21st transistor (Tr21') disposed at the other end of the 18th to 21st transistors (Tr18' to Tr21'), which are connected in series;

a clock signal (CLK) is supplied to each gate of the 18th and 21st transistors (Tr18', TR21');

the 22nd to 24th transistors (Tr22' to Tr24') are sequentially connected in series by connecting their sources or drains;

a ground voltage is applied to a source of the 22nd transistor (Tr22') disposed at one end of the 22nd to 24th transistors (Tr22' to Tr24'), which are connected in series;

a source of the 24th transistor (Tr24') disposed at the other end of the 22nd to 24th transistors (Tr22' to Tr24'), which are connected in series, is connected to a drain of the 21st transistor (Tr21');

a connection node of the 18th and 19th transistors (Tr18', Tr19') is connected to a connection node of the 22nd and 23rd transistors (Tr22', Tr23'), forming a third output node;

the third output node is connected to a gate of the 22nd transistor (Tr22') via the fourth inverter (Inv3');

signals from the complementary bit lines (BL, /BL) are supplied to each gate of the 19th and 23rd transistors (Tr19', Tr23') with no repetition; and the random-number data (R) or inversion data of the random-number data is supplied to each gate of the 20th and 24th transistors (Tr20, Tr24).

A ninth integrated memory circuit of the present invention is structured such that, based on any one of the third to eighth integrated memory circuits, the column decoder comprises a second predecoder, and a column decode line driver for driving column decode lines of the memory cells;

the second predecoder comprises a fifth inverter for inverting a part of bit data that is not supplied to the first predecoder, among the bit data constituting the address data, and a third domino-RSL gate (RSL_AND);

the third domino-RSL gate comprises 25th to 32nd transistors and a sixth inverter;

the 25th and 29th transistors are PMOS transistors;

the 26th to 28th transistors and 30th to 32nd transistors are NMOS transistors;

the 25th to 32nd transistors are sequentially connected in series by connecting their sources or drains;

a power-supply voltage is applied to a source of the 25th transistor disposed at one end of the 25th to 28th transistors, which are connected in series;

a ground voltage is applied to a source of the 28th transistor disposed at the other end of the 25th to 28th transistors, which are connected in series;

a clock signal is supplied to each gate of the 25th and 28th transistors;

a power-supply voltage is applied to a source of the 29th transistor;

the 30th and 31st transistors are connected in parallel;

a drain of the 29th transistor is connected to one of connection nodes of the 30th and 31st transistors;

a drain of the 32nd transistor is connected to the other connection node of the 30th and 31st transistors;

a source of the 32nd transistor is connected to a connection node of the 27th and 28th transistors;

a connection node of the 25th and 26th transistors is connected to a connection node of the 29th to 31st transistors, forming a fourth output node;

the fourth output node is connected to a gate of the 29th transistor via the sixth inverter;

1-bit data that is not supplied to the first predecoder, among the bit data constituting the address data, or output data of the fifth inverter is supplied to each gate of the 26th and 30th transistors;

1-bit data that is not supplied to the first predecoder, among the bit data constituting the address data, or output data of the fifth inverter, which is different from the data supplied to the gates of the 26th and 30th transistors, is supplied to each gate of the 27th and 31st transistors; and the random-number data (R) or inversion data (/R) of the random-number data is supplied to a gate of the 32nd transistor.

A tenth integrated memory circuit of the present invention is structured such that, based on any one of the third to eighth integrated memory circuits, the column decoder comprises a second predecoder, and comprises a column decode line driver for driving column decode lines of the memory cells;

the second predecoder comprises a fifth inverter for inverting a part of bit data that is not supplied to the first predecoder, among the bit data constituting the address data, and a third domino-RSL gate (RSL_AND);

the third domino-RSL gate comprises 25th to 32nd transistors and a sixth inverter;

the 25th and 29th transistors are NMOS transistors;

the 26th to 28th transistors and 30th to 32nd transistors are PMOS transistors;

the 25th to 32nd transistors are sequentially connected in series by connecting their sources or drains;

a ground voltage is applied to a source of the 25th transistor disposed at one end of the 25th to 28th transistors, which are connected in series;

a power-supply voltage is applied to a source of the 28th transistor disposed at the other end of the 25th to 28th transistors, which are connected in series;

a clock signal is supplied to each gate of the 25th and 28th transistors;

a ground voltage is applied to a source of the 29th transistor;

the 30th and 31st transistors are connected in parallel;

a drain of the 29th transistor is connected to one of the connection nodes of the 30th and 31st transistors;

a drain of the 32nd transistor is connected to the other connection node of the 30th and 31st transistors;

a source of the 32nd transistor is connected to a connection node of the 27th and 28th transistors;

a connection node of the 25th and 26th transistors is connected to a connection node of the 29th to 31st transistors, forming a fourth output node;

the fourth output node is connected to a gate of the 29th transistor via the sixth inverter;

1-bit data that is not supplied to the first predecoder, among the bit data constituting the address data, or output data of the fifth inverter is supplied to each gate of the 26th and 30th transistors;

1-bit data that is not supplied to the first predecoder, among the bit data constituting the address data, or output data of the fifth inverter, which is different from the data supplied to the gates of the 26th and 30th transistors, is supplied to each gate of the 27th and 31st transistors; and the random-number data (R) or inversion data (/R) of the random-number data is supplied to a gate of the 32nd transistor.

An eleventh integrated memory circuit of the present invention is structured such that, based on the 9th or 10th integrated memory circuit, the column decode line driver comprises a fourth domino-RSL gate (RSL_WDrive);

the fourth domino-RSL gate comprises 33rd to 41st transistors and a seventh inverter;

the 33rd and 38th transistors are PMOS transistors;

the 34th to 37th and the 39th to 41st transistors are NMOS transistors;

the 33rd to 37th transistors are sequentially connected in series by connecting their sources or drains;

a power-supply voltage is applied to a source of the 33rd transistor disposed at one end of the 33rd to 37th transistors, which are connected in series;

a ground voltage is applied to a source of the 37th transistor disposed at the other end of the 33rd to 37th transistors, which are connected in series;

a clock signal is supplied to each gate of the 33rd and the 37th transistors;

the 38th to 41st transistors are sequentially connected in series by connecting their sources or drains;

a power-supply voltage is applied to a source of the 38th transistor disposed at one end of the 38th to 41st transistors, which are connected in series;

a source of the 41st transistor disposed at the other end of the 38th to 41st transistors, which are connected in series, is connected to a drain of the 37th transistor;

a connection node of the 33rd and 34th transistors is connected to a connection node of the 38th and 39th transistors, forming a fifth output node;

the fifth output node is connected to a gate of the 38th transistor via the seventh inverter;

an output signal of the third domino-RSL gate is supplied to a gate (IN3, IN4) of the 34th or 35th transistors with no repetition;

an inversion signal (/IN3) of a signal (IN3) supplied to the gate of the 34th transistor is supplied to a gate of the 39th transistor;

an inversion signal (/IN4) of a signal (IN4) supplied to the gate of the 35th transistor is supplied to a gate of the 40th transistor; and the random-number data (R) or inversion data (/R) of the random-number data is supplied to each of the 36th and 41st transistors with no repetition.

A twelfth integrated memory circuit of the present invention is structured such that, based on the 9th or 10th integrated memory circuit, the column decode line driver comprises a fourth domino-RSL gate (RSL_WDrive);

the fourth domino-RSL gate (RSL_WDrive) comprises 33rd to 41st transistors and a seventh inverter;

the 33rd and 38th transistors are NMOS transistors;

the 34th to 37th transistors and the 39th to 41st transistors are PMOS transistors;

the 33rd to 37th transistors are sequentially connected in series by connecting their sources or drains;

a ground voltage is applied to a source of the 33rd transistor disposed at one end of the 33rd to 37th transistors, which are connected in series;

a power-supply voltage is applied to a source of the 37th transistor disposed at the other end of the 33rd to 37th transistors, which are connected in series;

a clock signal (CLK) is supplied to each gate of the 33rd and 37th transistors;

the 38th to 41st transistors are sequentially connected in series by connecting their sources or drains;

a ground voltage is applied to a source of the 38th transistor disposed at one end of the 38th to 41st transistors, which are connected in series;

a source of the 41st transistor disposed at the other end of the 38th to 41st transistors, which are connected in series, is connected to a drain of the 37th transistor;

a connection node of the 33rd and 34th transistors is connected to a connection node of the 38th and 39th transistors, forming a fifth output node;

the fifth output node is connected to a gate of the 38th transistor via the seventh inverter;

an output signal of the third domino-RSL gate is supplied to a gate (IN3, IN4) of the 34th or 35th transistors with no repetition;

an inversion signal (/IN3) of a signal (IN3) supplied to the gate of the 34th transistor is supplied to a gate of the 39th transistor;

an inversion signal (/IN4) of a signal (IN4) supplied to the gate of the 35th transistor is supplied to a gate of the 40th transistor; and the random-number data (R) or inversion data (/R) of the random-number data is supplied to each of the 36th and 41st transistors with no repetition.

A first cryptographic circuit of the present invention comprises one of the first to twelfth integrated memory circuits.

A random-number generating circuit of the present invention comprises:

a linear feedback shift register;

an N-stage selector circuit in double cascade connection;

an arbiter circuit; and an arithmetic gate that performs exclusive-OR operation with respect to an output signal from the linear feedback shift register and an output signal from the arbiter circuit, thereby outputting a random-number, the linear feedback shift register comprising N shift registers connected in series and a plurality of exclusive-OR operators, the arbiter circuit comprising an enable gate composed of a cross-coupled sense amplifier connected in series with and between a ground voltage (Gnd) and a power-supply voltage (Vdd), and two transistors in which their sources are connected to each other and their drains are connected to each other;

a first NAND gate in which a first input signal is supplied to one of the input ports, the other input port is connected to a first sensing node of the cross-coupled sense amplifier, and an output port is connected to a gate of one of the transistors of the enable gate; and a second NAND gate in which a second input signal is supplied to one of the input ports, the other input port is connected to a second sensing node of the cross-coupled sense amplifier, and an output port is connected to a gate of the other transistor of the enable gate, wherein:

an output from the shift register is supplied to the selector circuit as a selection signal challenge, output signals from two final stages of the selector circuit are supplied to the arbiter circuit as the first and second input signals, one of the outputs from the first and second NAND gates is output from the arbiter circuit as the random-number.

A second cryptographic circuit of the present invention comprises one of the first to twelfth integrated memory circuits, and the above random-number generating circuit, wherein the output from the random-number generating circuit is the random-number data (R) supplied to the integrated memory circuit.

A third cryptographic circuit of the present invention comprises the first or second cryptographic circuit as a circuit for DES encryption or AES encryption in which an S-Box comprises the integrated memory circuit.

The present invention provides an integrated memory circuit and a cryptographic circuit using the integrated memory circuit, which serve as a highly reliable cryptographic technique with tamper resistance and DPA resistance.

Further, as described above, by implementing an S-box using a secure memory using random number as an input data as a hardware core, it becomes possible to enable the cryptographic circuit designer to create a DPA-resistant cryptographic circuit. The part of the secure memory circuit may be composed of the domino-RSL gate, however, the designer need not care about the domino-RSL gate, because the gate is already designed inside the secure memory. More specifically, the cryptographic circuit designer can create the layout of entire cryptographic circuit using the standard automatic layout tool (placement and route tool), by placing secure memory hardware macro as a S-Box, and automatic placement of standard cells as other circuits. This eliminates the need for a logic synthesis tool for a domino circuit or a special cell library for a domino-RSL gate. This also eliminates the need to consider the /CLK signal line load required for the domino-RSL gate.

Moreover, this method also has an advantage in that the same hardware core can be used for the 8 kinds of S-box required for a DES cryptographic circuit by simply changing the data in the secure memory. In the AES cryptographic circuits, which is a new standard regarded as a replacement for conventional DES cryptographic circuits, only the S-box is composed of a nonlinear gate; therefore, the method is easily compatible with the AES cryptographic circuit by using a secure memory with 8-bit input and 8-bit output (capacity: 2 k bits) for an S-box of the AES cryptographic circuit.

BRIEF DESCRIPTION OF DRAWINGS

FIG. 2 is a diagram showing complementary logic with precharge.

FIG. 3 is a circuit diagram showing an RSL NAND gate.

FIG. 6 is a circuit diagram showing a domino-RSL AND/OR gate.

FIG. 21 is a circuit diagram showing a sense amplifier circuit according to an embodiment of the present invention.

DESCRIPTION OF EMBODIMENTS

Hereinafter, an embodiment according to the present invention will be described based on the accompanying drawings.

Figure 8:
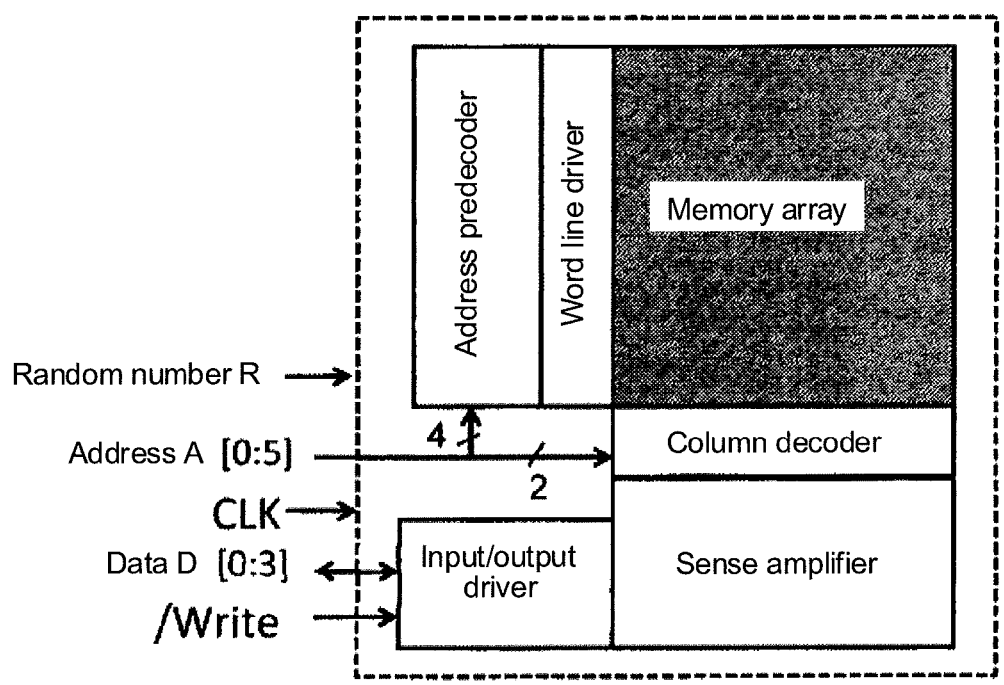
FIG. 8 is a block diagram showing a schematic configuration of a secure memory according to an embodiment of the present invention.

FIG. 8 shows a function block diagram of a tamper-resistant integrated memory circuit (secure memory) according to the embodiment of the present invention. This secure memory is composed of a memory array, a row decoder composed of an address predecoder and a word line driver, a column decoder, a sense amplifier, and an input/output driver. The secure memory receives a clock CLK, address data A, and a control signal /Write from the outside, and performs writing/reading of data on a corresponding memory cell in the memory array. The secure memory is different from a general memory in that a random number R is supplied into the secure memory from an external random-number generator (not shown). The address A is an input, and data D is input/output. If the secure memory is used as an S-box of a DES cryptographic circuit, the address A is a 6-bit input, and the data D is a 4-bit output as shown in FIG. 8. The control signal /Write of Read/Write is unnecessary if the memory is ROM (read-only memory). However, if the memory is RAM (random access memory), the control signal /Write is necessary since it is used for writing table data of an S-box as an initial value. Only during writing, /Write=0.

Hereinafter, the components of the secure memory will be specifically described. It is noted that, in the following, for easy understanding of the present invention, the components will be described as appropriate in comparison to hitherto-known techniques. In addition, although the description will be given on the assumption that the secure memory is used mainly as an S-box of a DES cryptographic circuit, the use of the secure memory is not limited thereto.

Memory Array

Figure 9:
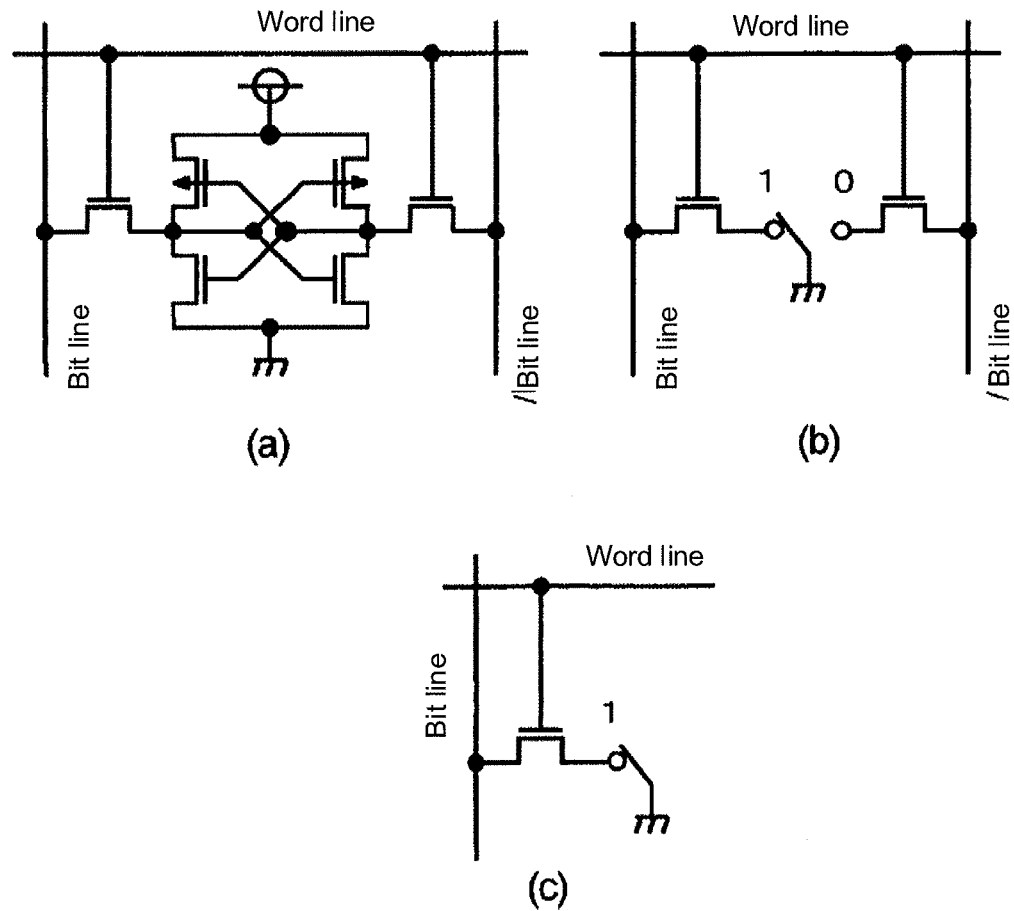
FIG. 9 is a circuit diagram showing examples of a memory cell.
Figure 10:
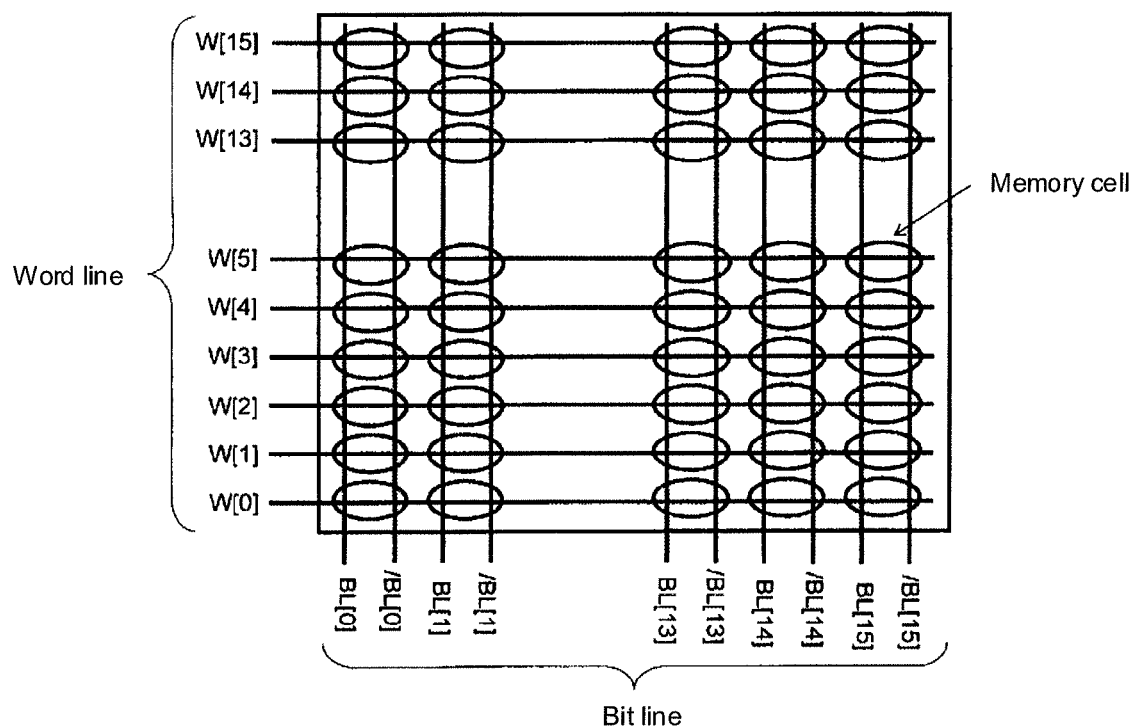
FIG. 10 is a diagram showing a schematic structure of a memory cell array.

As memory cells within the memory array, static RAM type (a) or mask ROM type (b) shown in FIG. 9 is used. The static RAM shown in FIG. 9 has a general circuit structure, and reading and writing of complementary bit line data are performed by setting a word line to Hi. In the case of mask ROM, ROM data is written by changing the layout of a photomask when the LSI is manufactured, depending on whether the table value of an S-box is 1 or 0. In general, a contact layer or a via layer is used in many cases. In a general mask ROM (c), a bit line does not have a complementary structure. However, in the mask ROM (b) according to the present invention, two transistors are required for driving complementary bit lines as a single cell. Without such complimentary bit line, power consumption varies depending on whether a value read from a cell is 0 or 1. In other words, any memory cell can be used insofar as it is capable of reading a complementary-type bit line. For example, a dynamic RAM, a ferroelectric memory, or a memory using a magnetic material may be used. If the memory array is used as an S-box for DES, the memory array is a 256-bit memory array having a 6-bit address and a 4-bit output and has a structure in which there are 16 word lines W and 16 bit line pairs (BL and /BL) (32 bit lines) as shown in FIG. 10. Each memory cell is connected to a single word line and a single bit line pair.

Row Decoder

The row decoder is a circuit that decodes a 4-bit address, and selects and drives one of 16 word lines. The row decoder is generally composed of an address predecoder (hereinafter, also referred to simply as predecoder) and a word line driver.

Predecoder

Figure 11:
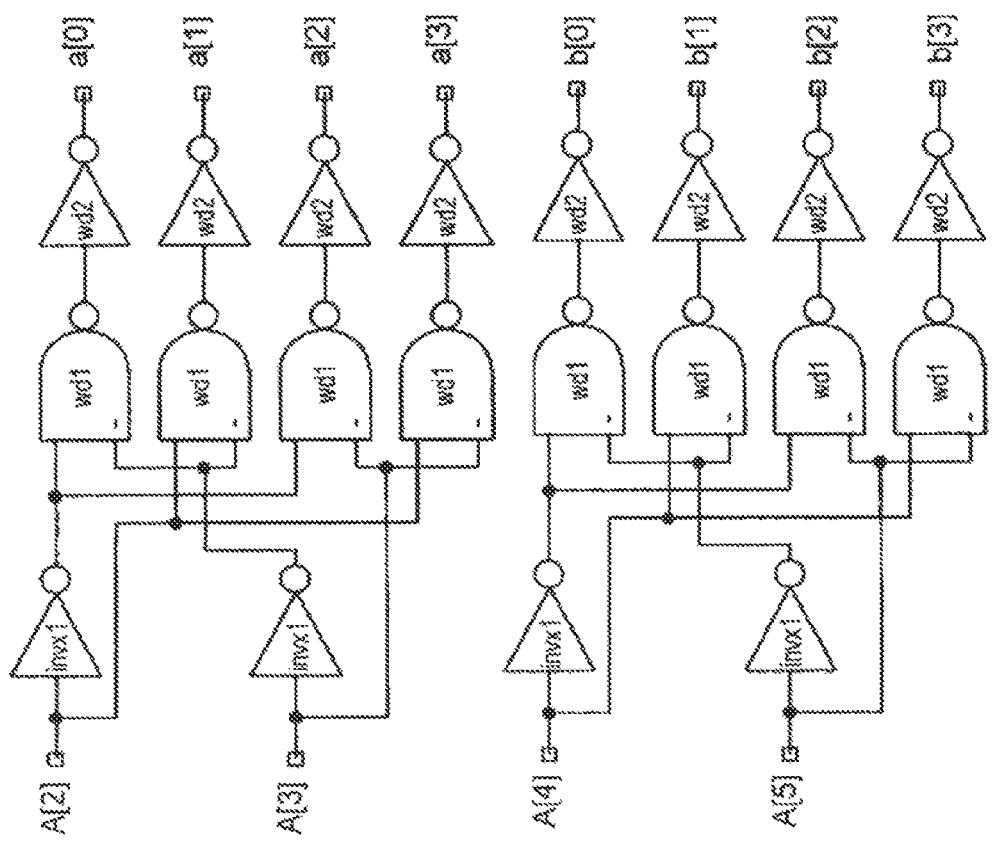
FIG. 11 is a diagram showing a hitherto-known predecoder.

FIG. 11(a) shows a circuit used as a predecoder in a hitherto-known general circuit. The circuit serving as a predecoder generates a signal in a pattern shown in a table in FIG. 11(b). More specifically, the predecoder is a combinatorial logic circuit that decodes four states of address signals of A[2] and A[3], and sets one of signal lines of a[0], a[1], a[2], and a[3] to logic 1. Similarly, the combinatorial logic circuit predecodes address signals of A[4] and A[5] into signals of b[0], b[1], b[2], and b[3]. The hitherto-known circuit shown in FIG. 11(a) uses a NAND gate. As is the case with the AND gate in FIG. 1 described for the principle of DPA, the NAND gate is a nonlinear gate and thus can be a target of DPA attacks.

Figure 12:
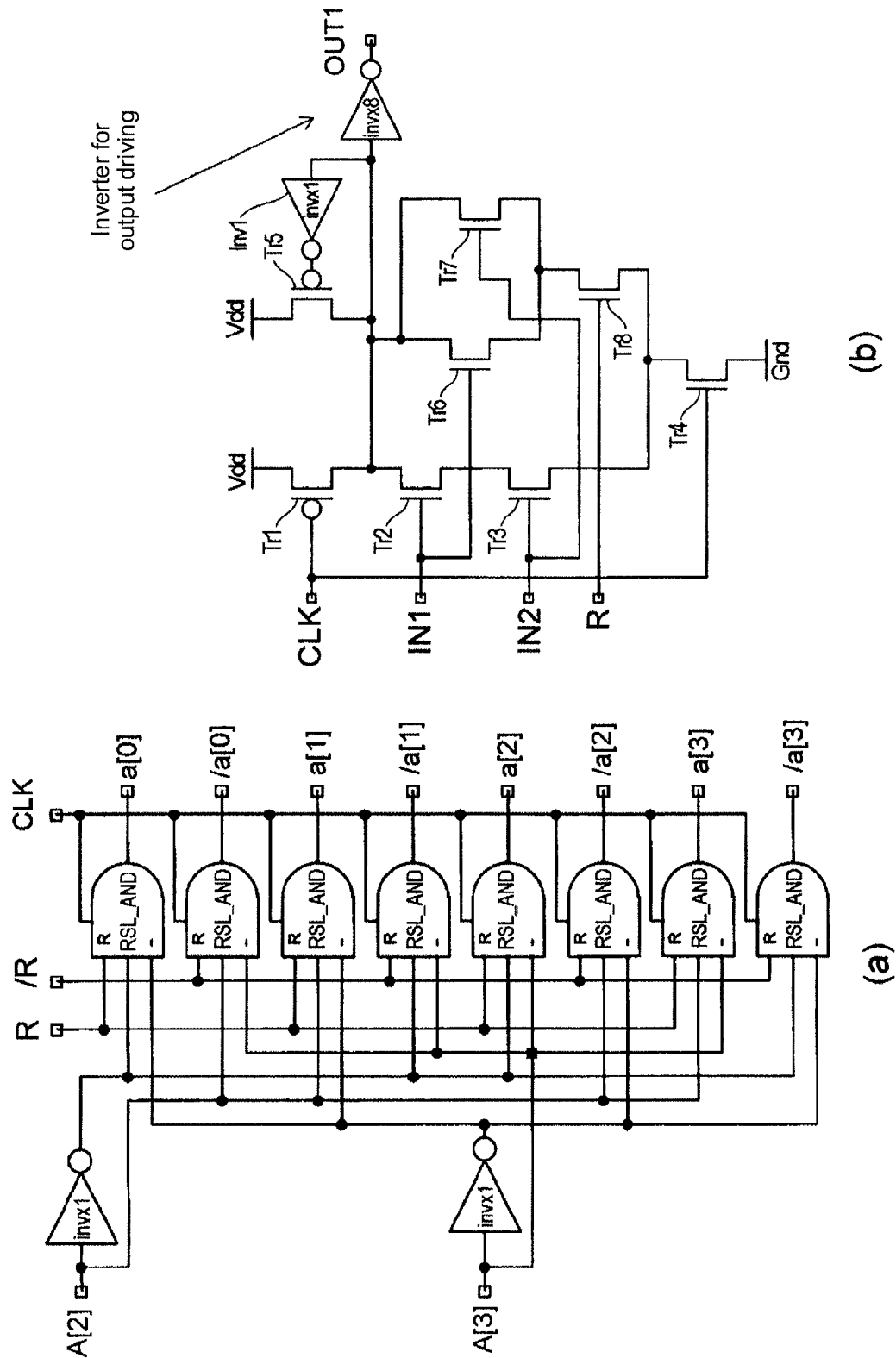
FIG. 12 is a circuit diagram showing a predecoder according to an embodiment of the present invention.

In contrast, in the present invention, the predecoder is achieved by using a domino-RSL gate RSL_AND as shown in FIG. 12(a). FIG. 12(b) specifically shows a circuit diagram of the domino-RSL gate RSL_AND. Although the domino-RSL gate RSL_AND additionally includes an inverter for driving outputs, the domino-RSL gate RSL_AND is equivalent to the circuit in FIG. 6(a). The reference characters "invx1" and "invx8" in the inverters indicate a difference in size (gate width) between NMOS and PMOS transistors constituting the inverter. If a number following invx is high, the size is large, meaning that a large load capacitance can be driven. (The same applies to the circuit diagrams other than FIG. 12.)

Among inputs of the domino-RSL gate RSL_AND, a clock CLK is supplied to a first input terminal, and inputs A[2] and A[3] or signals obtained by inverting the inputs A[2] and A[3] are supplied to second and third input terminals IN1 and IN2. Although only "R" is shown at a fourth input terminal in FIG. 12(b), a random number R or an inversion signal /R thereof is supplied from the fourth input terminal.

As shown in FIG. 12, output signals a[0] to a[3] and /a[0] to /a[3], which are complementary signals, are generated from the inputs A[2] and A[3]. Although FIG. 12 shows only a circuit pertaining to the inputs A[2] and A[3], a circuit pertaining to inputs A[4] and A[5] is also configured in a similar structure, and output signals b[0] to b[3] and /b[0] to /b[3] corresponding to the output signals a[0] to a[3] and /a[0] to /a[3] in FIG. 12 are generated from the circuit.

Figure 13:
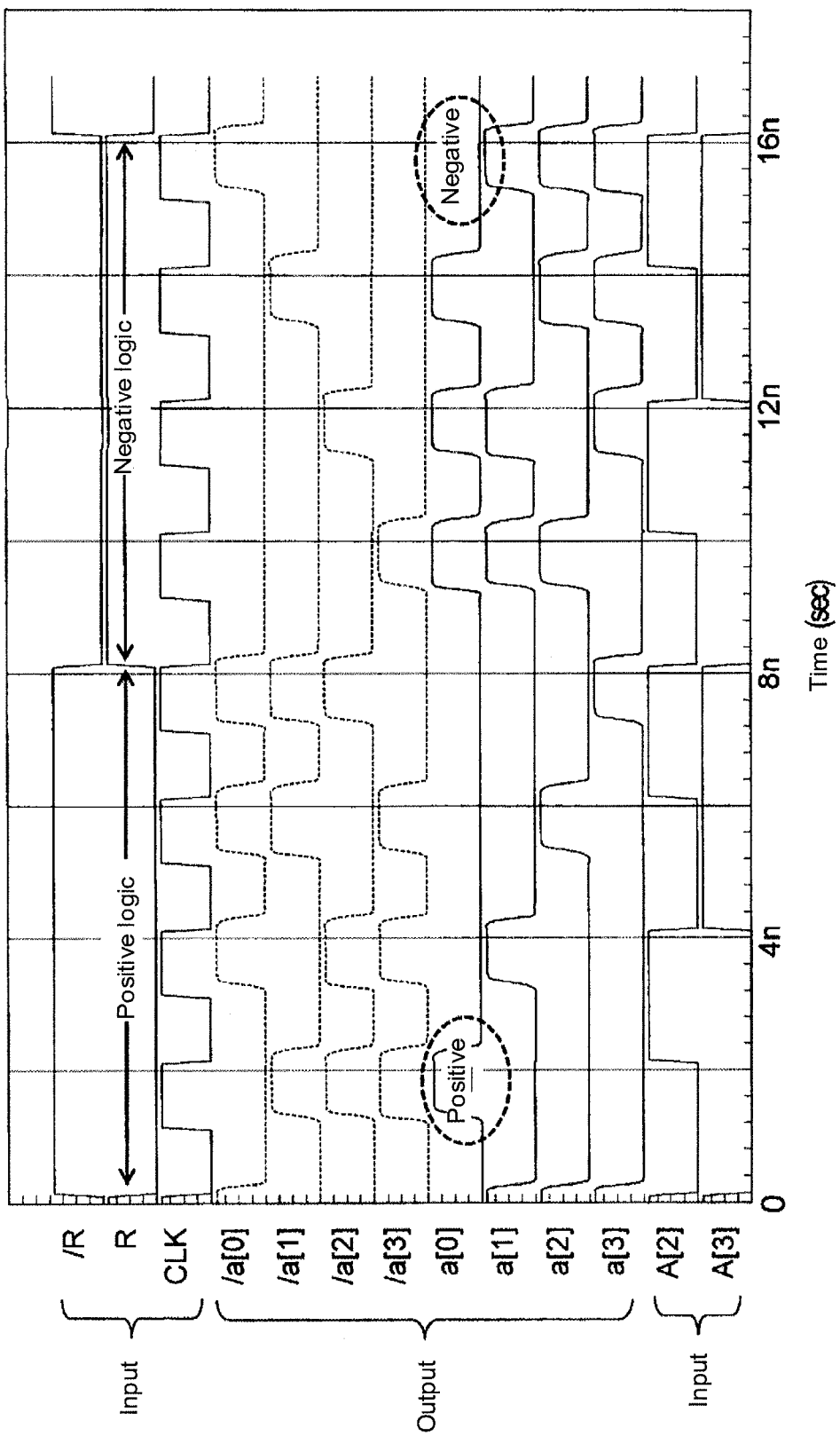
FIG. 13 is a timing chart showing an operation waveform of the predecoder shown in FIG. 12.

An operation waveform of the predecoder of FIG. 12(a) is shown in FIG. 13. Since the domino-RSL gate is a dynamic circuit, all inputs and outputs are reset to 0 during a precharge period where CLK=0. When CLK=1, output values are determined according to input signals. However, when a positive logic operation with random number R=0 is performed, the same results as in the table of FIG. 11(b) are output to a[0], a[1], a[2], and a[3]. However, it should be noted that, in the predecoder according to the present invention, not only a[0], a[1], a[2], and a[3], but also /a[0], /a[1], /a[2], and /a[3], which are the inversion signals thereof (only during a period when CLK=1), are output by using the domino-RSL gate. A negative logic operation with R=1 is performed in a similar manner. In a given signal line, for example, a[0], the probability that Hi data is output is ¼ in positive logic, but the probability that Hi data is output is ¾ in negative logic. Thus, assuming that the random number R takes either 1 or 0 with a probability of ½, the probability of Hi-transition in the a[0] node becomes ½ for any input data. Similarly, the probabilities that the signal lines a[0] to a[3] and /a[0] to /a[3] output Hi data are all ½; thus, power consumption becomes constant regardless of the input value of the address.

Word Line Driver

Figure 14:
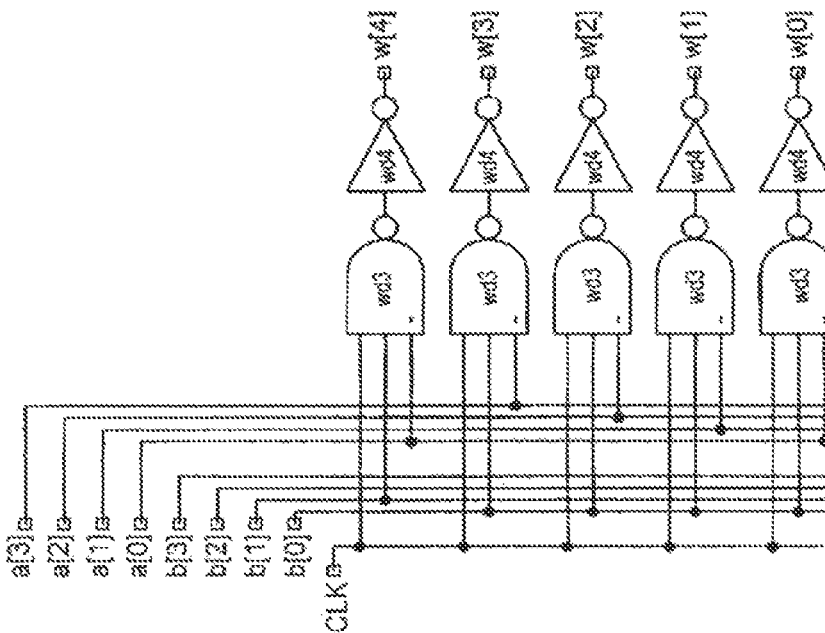
FIG. 14 is a diagram showing a hitherto-known word line driver.

A hitherto-known word line driver is composed of a circuit shown in FIG. 14(a). As shown therein, the 16 word lines are driven by using 3-input AND gates wd3. Each wd3 is composed of two signal lines selected from two kinds of predecode signals, i.e., one from a[0] to a[3] and one from b[0] to b[3], and a CLK signal. The CLK signal serves to control the timing at which a word line is activated. FIG. 14(b) is a table showing selection of word lines W by the predecode signals a[0] to a[3] and b[0] to b[3]. In FIG. 14(a), a part of the circuit is omitted; i.e., only 5 of the 16 3-input AND gates wd3 and only 5 of the 16 word lines W are illustrated. Similarly, the table in FIG. 14(b) shows data for 5 word lines W.

In contrast, the word line driver according to the present invention is made of a circuit shown in FIG. 15(a). FIG. 15(b) specifically shows a circuit diagram of a domino-RSL gate RSL_WDriv. The word line driver according to the present invention is composed of 16 domino-RSL gates RSL_W-Drive. Among them, only domino-RSL gates RSL_WDrive that drive word lines w[0] to w[4] are shown in FIG. 15(a). In addition, each reference character b shown in each domino-RSL gate RSL_WDrive in FIG. 15(a) indicates input of an inversion signal.

In each domino-RSL gate RSL_WDrive, two types of precode signals a and b and complementary signals /a and /b thereof are supplied to inputs IN3, IN4, /IN3, and /IN4. In other words, in a single domino-RSL gate RSL_WDrive, for example, a[i] and /a[i] (i=0 to 3) are supplied to IN3 and /IN3, and b[j] and /b[j] (j=0 to 3) are supplied to IN4 and /IN4. In each domino-RSL gate RSL_WDrive, OUT2 goes to Hi state during a period where CLK=1 in the following two cases; one case is both IN3 and IN4 are Hi data when R=0 (positive logic), another case is both /IN3 and /IN4 are Hi data when R=1 (negative logic). As a result, the word line is activated.

Figure 15:
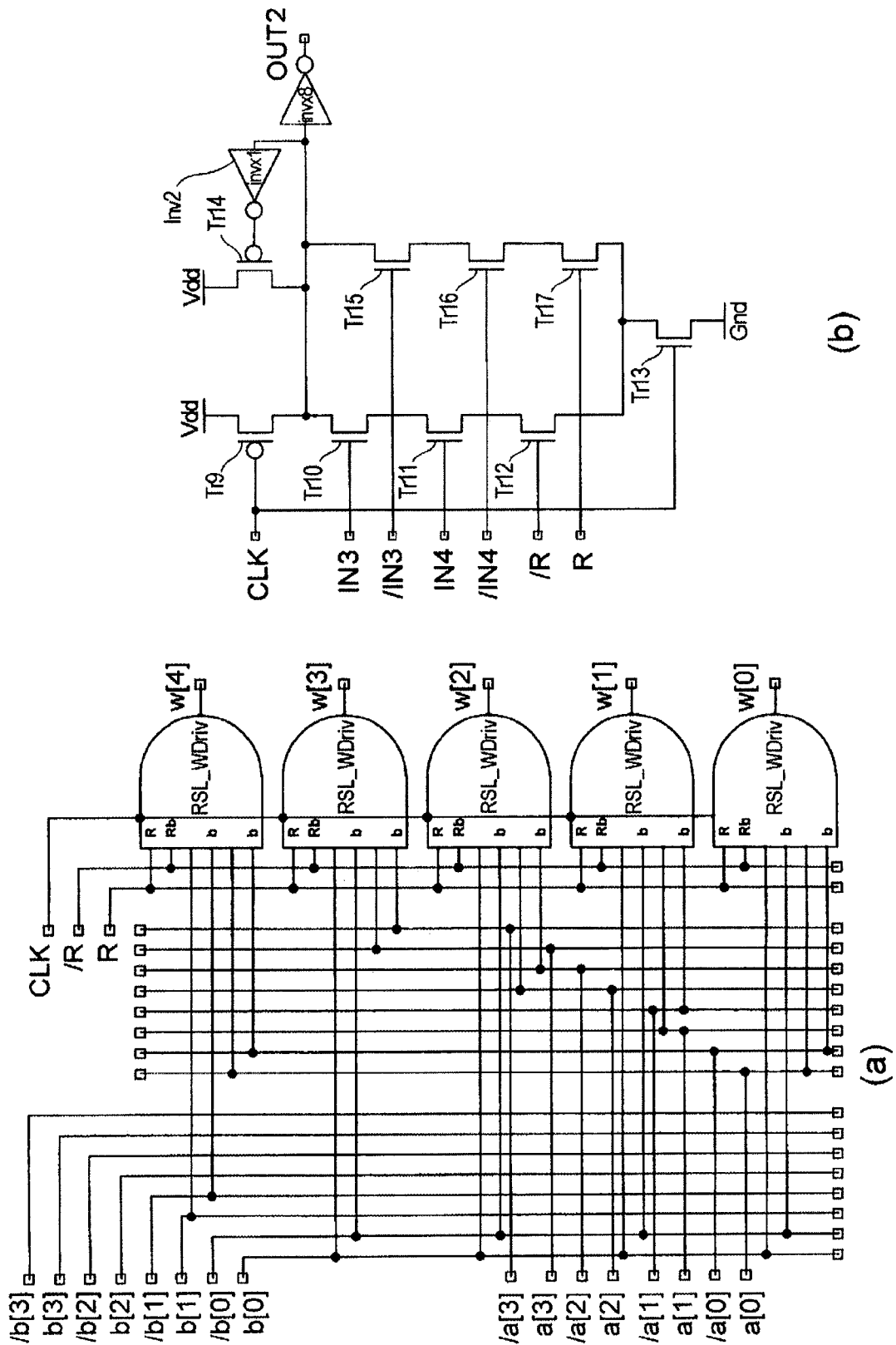
FIG. 15 is a circuit diagram showing a word line driver according to an embodiment of the present invention.
Figure 16:
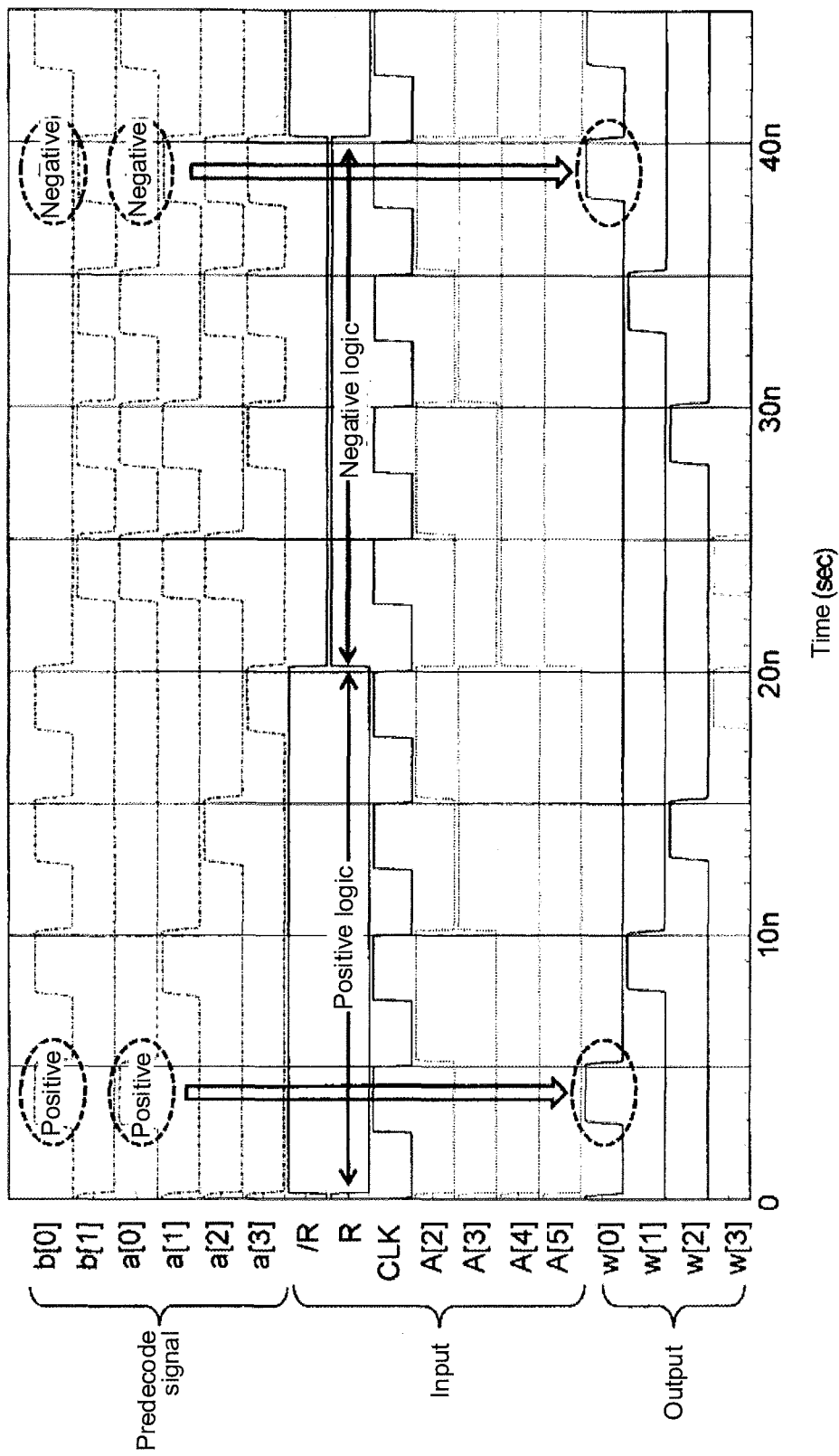
FIG. 16 is a timing chart showing an operation waveform of the word line driver shown in FIG. 15.

An operation waveform of the circuit of FIG. 15(a) is shown in FIG. 16. When R=0, if a[0]=b[0]=Hi, w[0]=Hi. When R=0, if a[0]=b[0]=Lo (here, /a[0]=/b[0]=Hi (not shown in the waveform)), w[0]=Hi.

Confirmation of Row Decoder Operation

Figure 17:
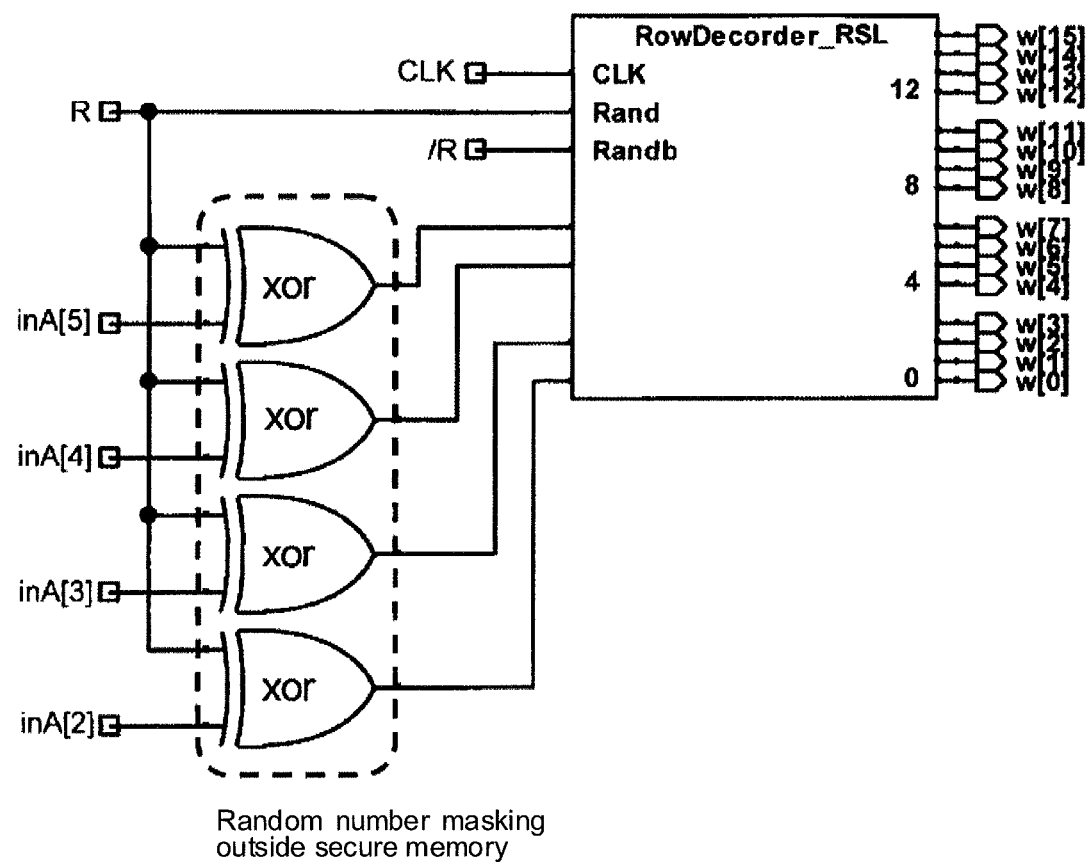
FIG. 17 is a circuit diagram showing a circuit for checking an address and a word line.
Figure 18:
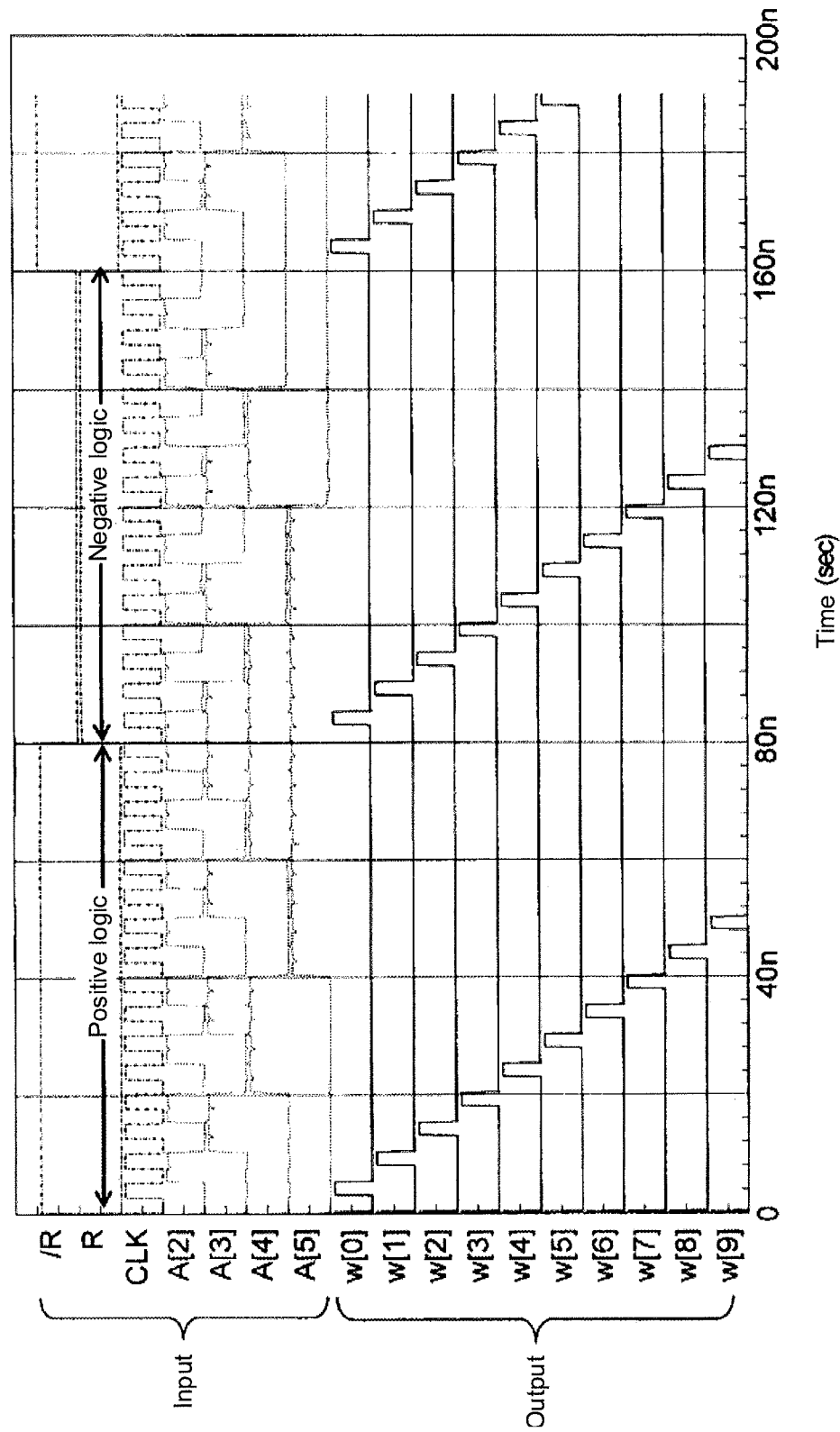
FIG. 18 is a timing chart showing an operation waveform of the circuit shown in FIG. 17.

FIG. 17 shows a circuit diagram showing operation of the row decoder including the predecoder and the word line driver. RowDecoder_RSL in FIG. 17 is a row decoder for simulation, which is composed of the circuits of FIGS. 12 and 15. When an address inA[5:2] is incremented from 0 to 15, if the random number R=0 (positive logic), an address A[5:2]=inA[5:2] is supplied to the row decoder RowDecoder_RSL. On the other hand, when the random number R=1 (negative logic), the address inA[5:2] is inverted by an EXOR gate and A[5:2]=/in A[5:2] is supplied to the row decoder RowDecoder_RSL. An operation waveform obtained as a result of simulation with the circuit in FIG. 17 is shown in FIG. 18. The waveform shows that the word lines are sequentially activated in order from w[0] to w[15] regardless of whether R=0 or 1.

Column Decoder and Sense Amplifier Circuit

As shown in FIG. 8, the column decoder and the sense amplifier circuit for reading data from the memory array are provided on the path between the memory array and the output. The column decoder is a circuit for selecting data required for the output, among the data read from the memory array. For example, in a DES cryptographic circuit, the column decoder decodes addresses A[0] to A[1] and selects four items of data from 16 items of data output from the memory array. The column decoder according to the present invention is configured using a domino-RSL gate and has a similar structure to that of the above-described row decoder of the present invention. In other words, the column decoder according to the present invention is composed of a predecoder (see FIG. 12) and a column decode line driver (corresponding to the word line driver in FIG. 15). In the operation of the column decoder, an output signal (corresponding to OUT2 in FIG. 15(b)) of the column decode line driver serves as a selection signal of column data, namely, a column decode signal (see FIG. 21 described below).

Figure 19:
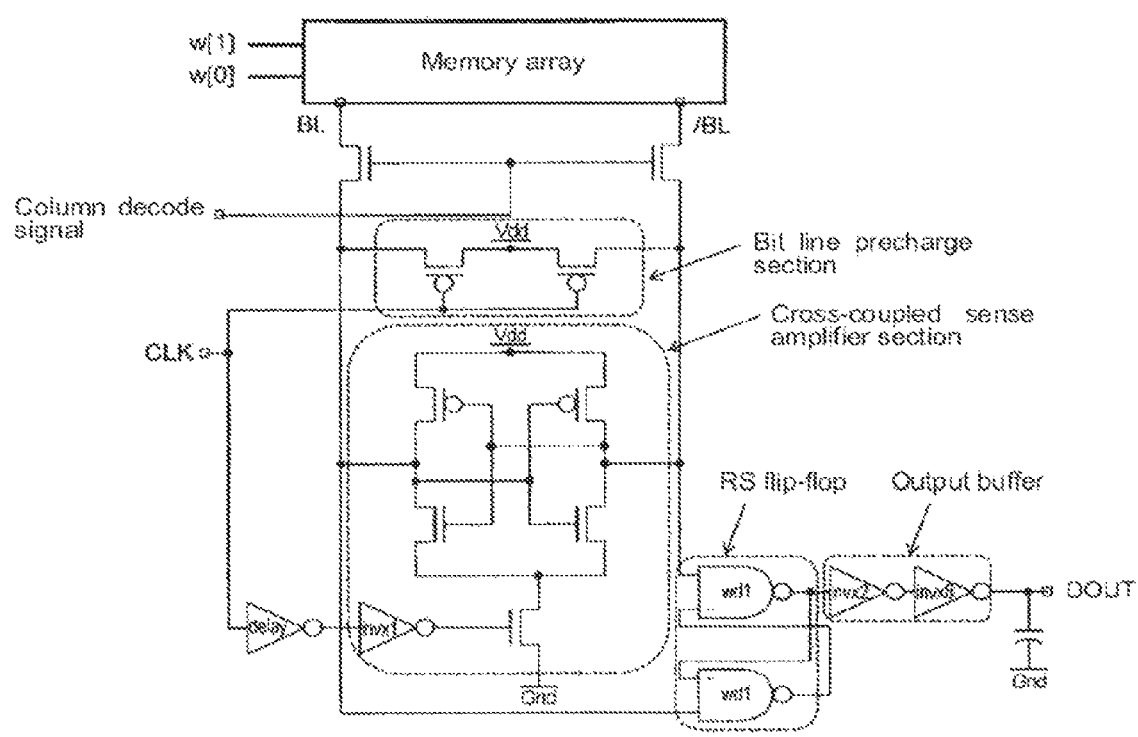
FIG. 19 is a circuit diagram showing a hitherto-known sense amplifier circuit.
Figure 20:
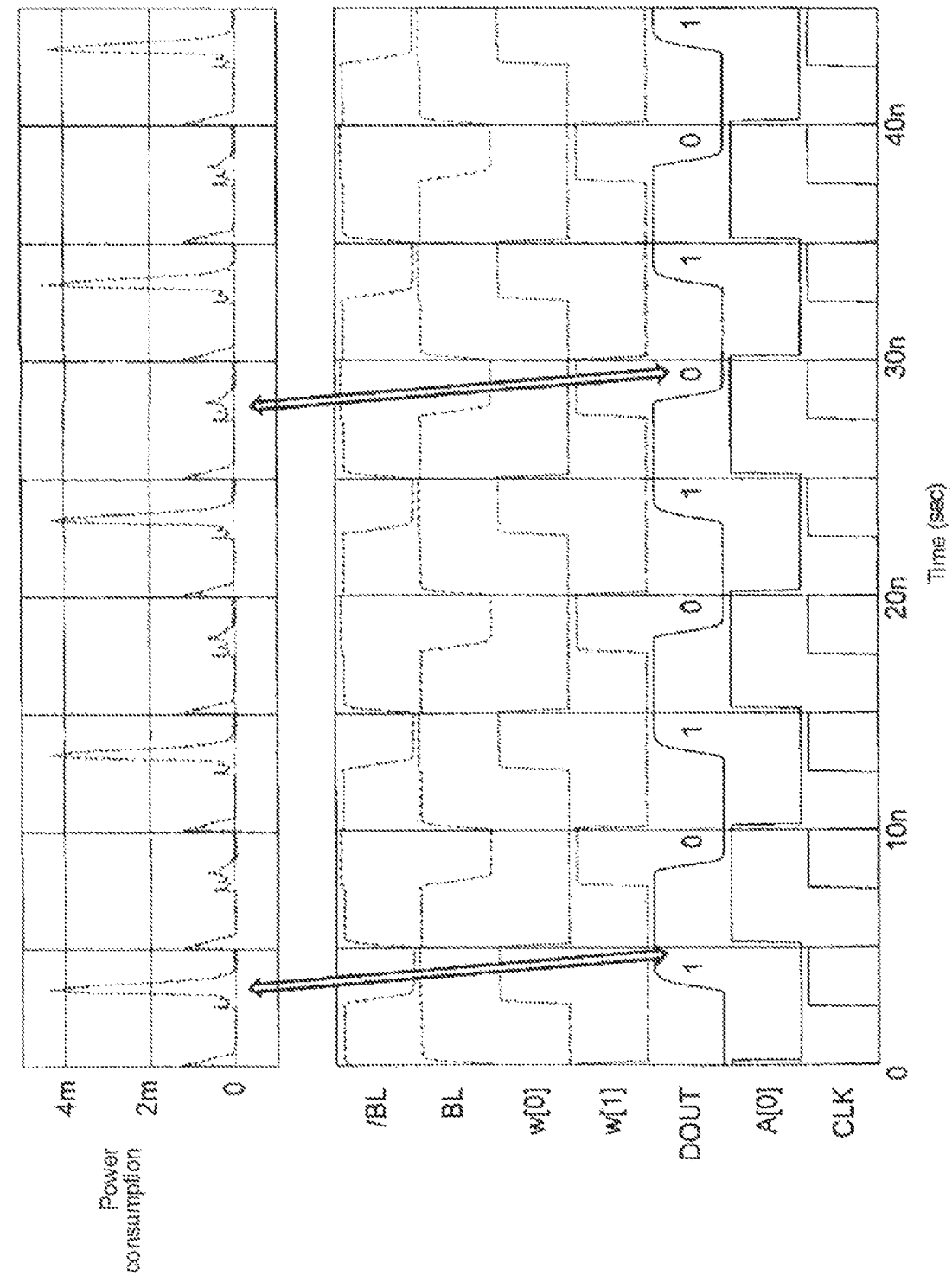
FIG. 20 is a timing chart showing operation and power consumption of the sense amplifier circuit shown in FIG. 19.

FIG. 19 shows a hitherto-known sense amplifier circuit. In this sense amplifier circuit, a bit line precharge section is used for setting a bit line signal pair (BL and /BL) to a Vdd potential before the reading begins. Although not shown in the drawing, the same precharge section is also present within a memory array. During the reading of bit lines, a CLK signal is Hi and the precharge section is inactivated. At the same time, a word line N[0] or w[1]) within the memory array is activated, and data is output to the bit line signal pair (BL and /BL) by a memory cell (reading of data from the memory cell). The potential of the bit line signal pair is first transmitted to an NMOS transmission gate into which a column decode signal is supplied, and then reaches a cross-couple-type sense amplifier section (cross-coupled sense amplifier section) where the data is amplified. The amplified complementary data is latched by an RS flip-flop composed of two NAND gates wd1 and is output as an output DOUT via an output buffer. FIG. 20 shows an operation waveform (lower portion) and power consumption (upper portion) of the hitherto-known sense amplifier circuit. When the address A[0]=0, data 1 (BL=Hi and /BL=Lo) is read from the memory array; when the address A[0]=1, data 1 (BL=Lo and /BL=Hi) is read from the memory array. In these cases, DOUT is either Lo or Hi; accordingly, a large amount of power is consumed to charge a parasitic capacitance of 1 pF associated with DOUT only when DOUT=1. Therefore, as shown by outline arrows in FIG. 20, a correlation is produced between the output logic data and the power consumption. As such, this sense amplifier circuit can be a target of DPA attacks.

Figure 1:
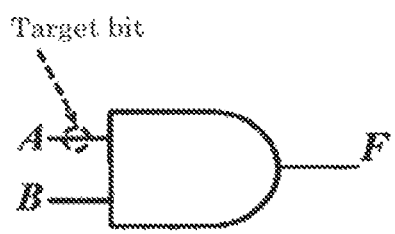
FIG. 1 is a diagram illustrating the principle of DPA attack.
Figure 4:
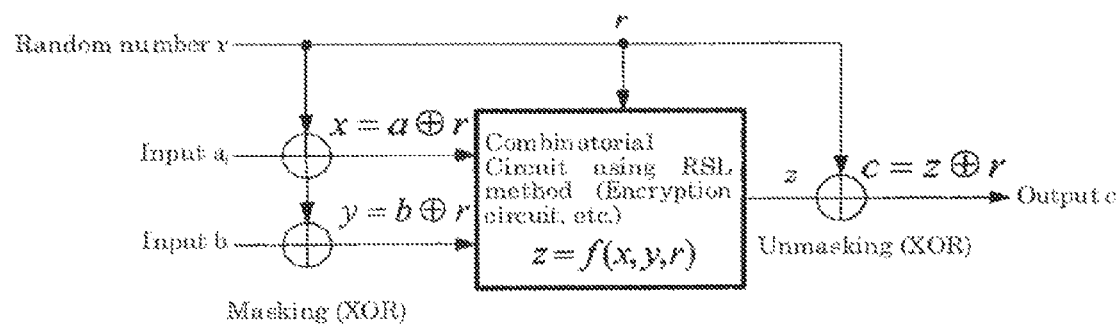
FIG. 4 is a block diagram showing operations using an RSL method.
Figure 5:
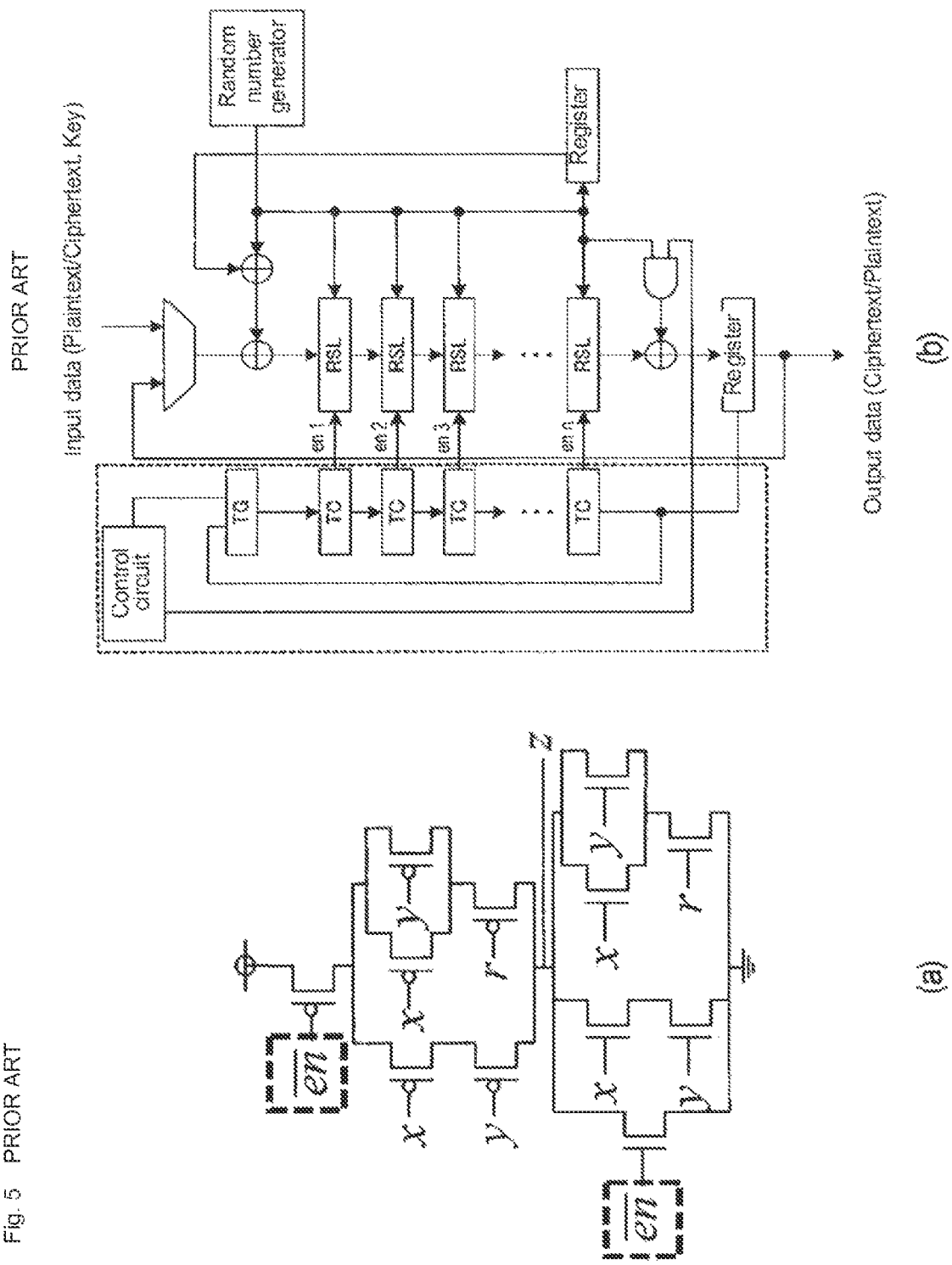
FIG. 5 is a circuit diagram illustrating asynchronous control for an en signal in the RSL method.
Figure 7:
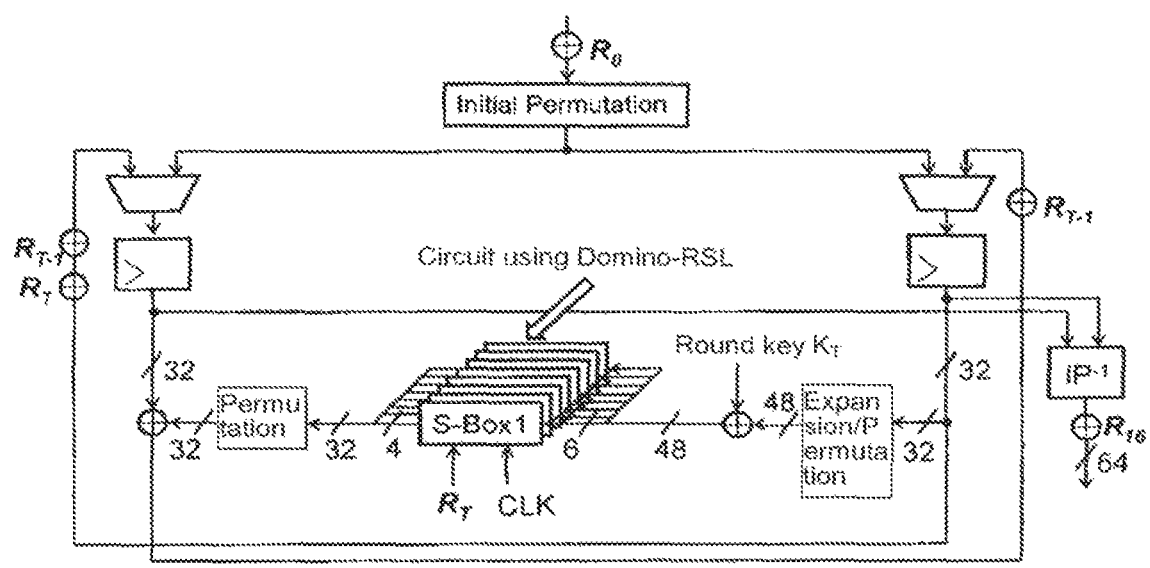
FIG. 7 is a diagram showing a DES cryptographic circuit implemented with a domino-RSL circuit.

In contrast, the sense amplifier circuit according to the invention is configured as shown in FIG. 21. The operation from a memory array to a cross-coupled sense amplifier unit is the same as in the hitherto-known sense amplifier circuit, except that a domino-RSL multiplexer RSL_MUX is used instead of the RS flip-flop. In FIG. 21(a), 0 and 1 in the domino-RSL multiplexer RSL_MUX represent input terminals. Bit lines BL and /BL are connected to the input terminals 1 and 0 via separate inverters. FIG. 21(b) illustrates a specific circuit diagram of the domino-RSL multiplexer RSL_MUX. In the domino-RSL multiplexer RSL_MUX, if R=0, an inversion signal of /BL (a BL signal, namely, the same logic as the cell data) is transmitted to an output buffer and output to DOUT. If R=1, an inversion signal of BL (a /BL signal, namely, inversion logic of the cell data) is transmitted to an output buffer and output to DOUT. It should be noted that this circuit is designed such that the circuit from the memory array to DOUT is completely symmetrical on the BL side and the /BL side.

Figure 22:
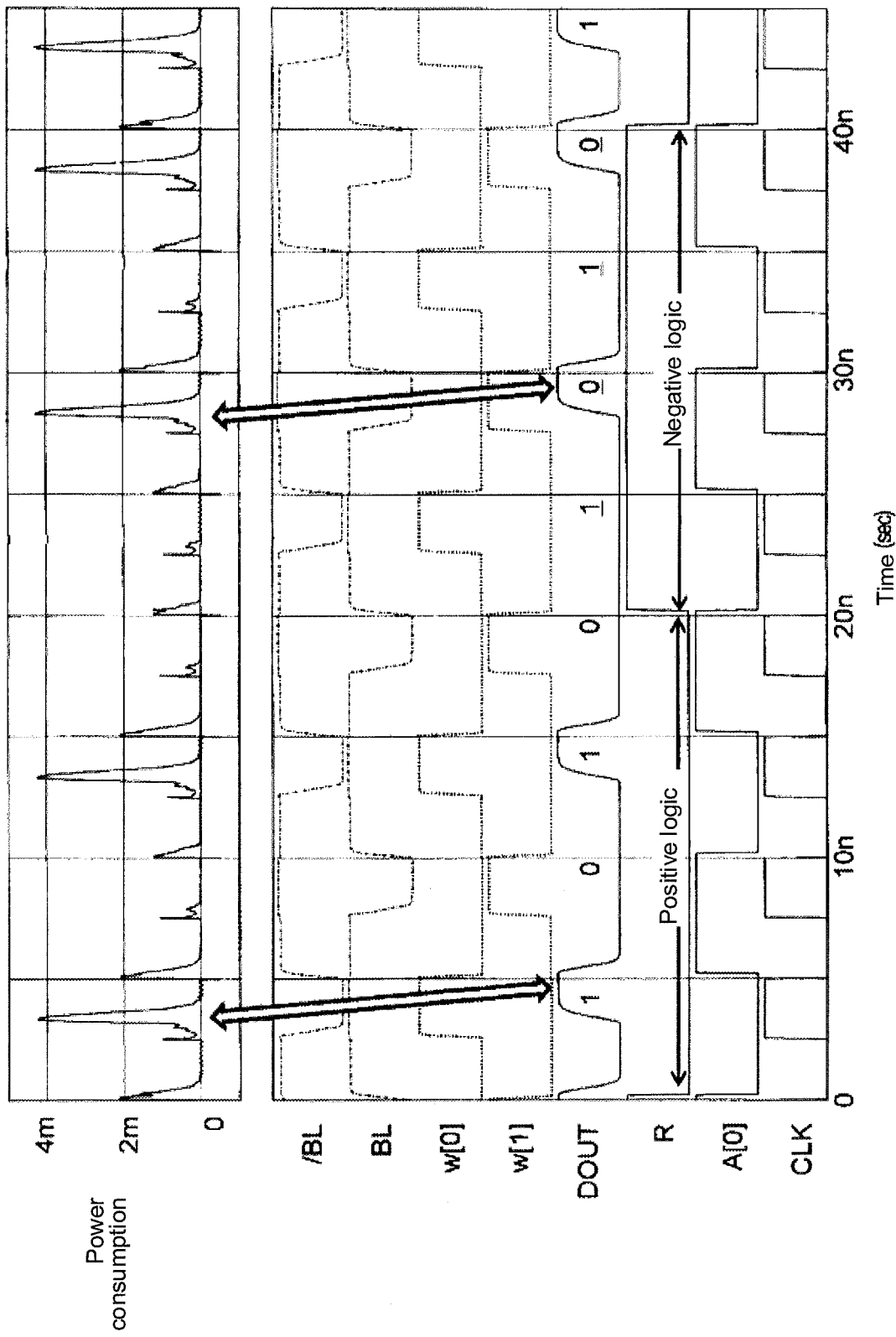
FIG. 22 is a timing chart showing operation and power consumption of the circuit shown in FIG. 21.

FIG. 22 shows an operation waveform (lower portion) and power consumption (upper portion) of the sense amplifier circuit shown in FIG. 21. When the random number R=0, data of positive logic is output to DOUT; when the random number R=1, data of negative logic is output to DOUT. When DOUT is Hi, power consumption is increased. Therefore, as shown by outline arrows in FIG. 22, no correlation is produced between the output logic data and the power consumption, and therefore this sense amplifier circuit is immune to DPA attacks.

The components constituting the tamper-resistant integrated memory circuit (secure memory) according to the present invention, namely, the memory array, the row decoder, the column decoder, and the sense amplifier circuit, were thus explained in comparison to the hitherto-known techniques. The present invention is characterized in that the cells having complementary input/output lines, namely, the BL and /BL lines, are used in the memory cell, in that in the row and column decoders, two types of the domino-RSL gates RSL_AND and RSL_WDriv are used for the address decode circuit instead of the AND gate, and in that the sense amplifier circuit includes the domino-RSL multiplexer so as to select one side of complementary data, thereby enabling signal transmission to the output DOUT with a completely symmetrical signal path from the BL and /BL signals.

Figure 23:
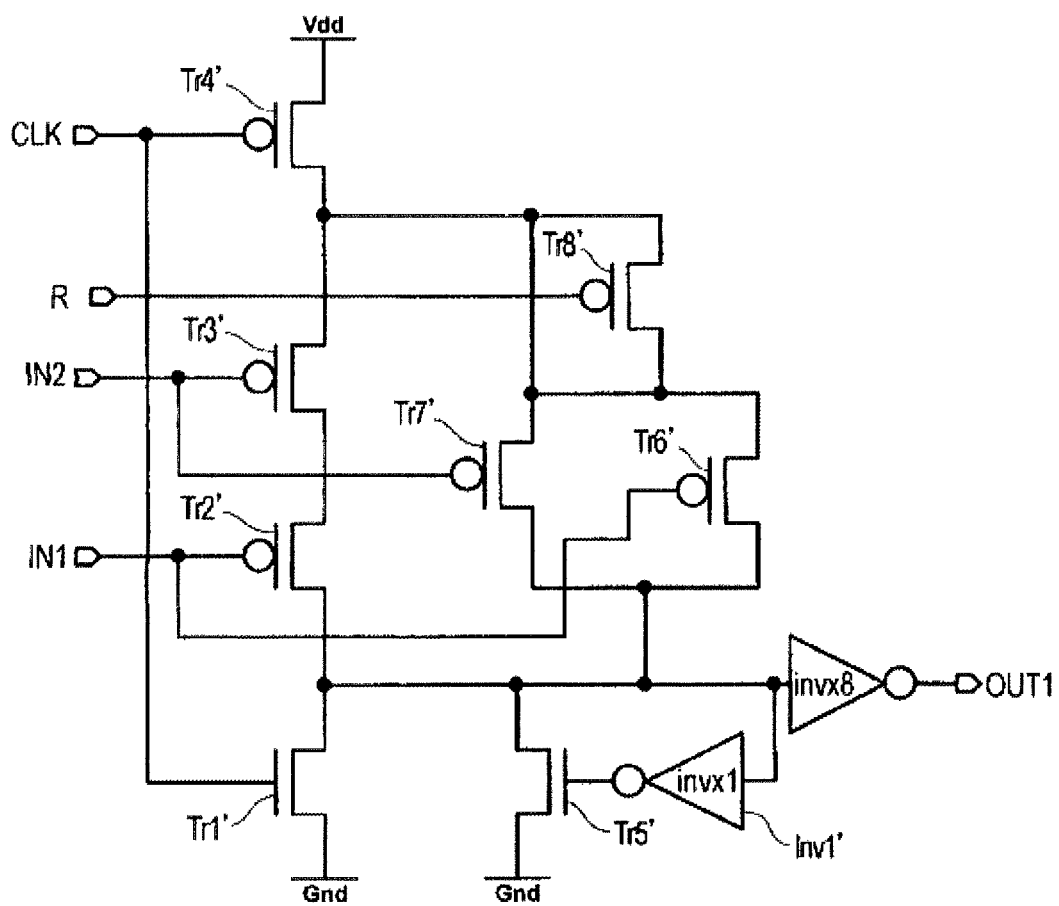
FIG. 23 is a circuit diagram showing an example of a domino-RSL gate that can be replaced with the domino-RSL gate in FIG. 12(b).
Figure 24:
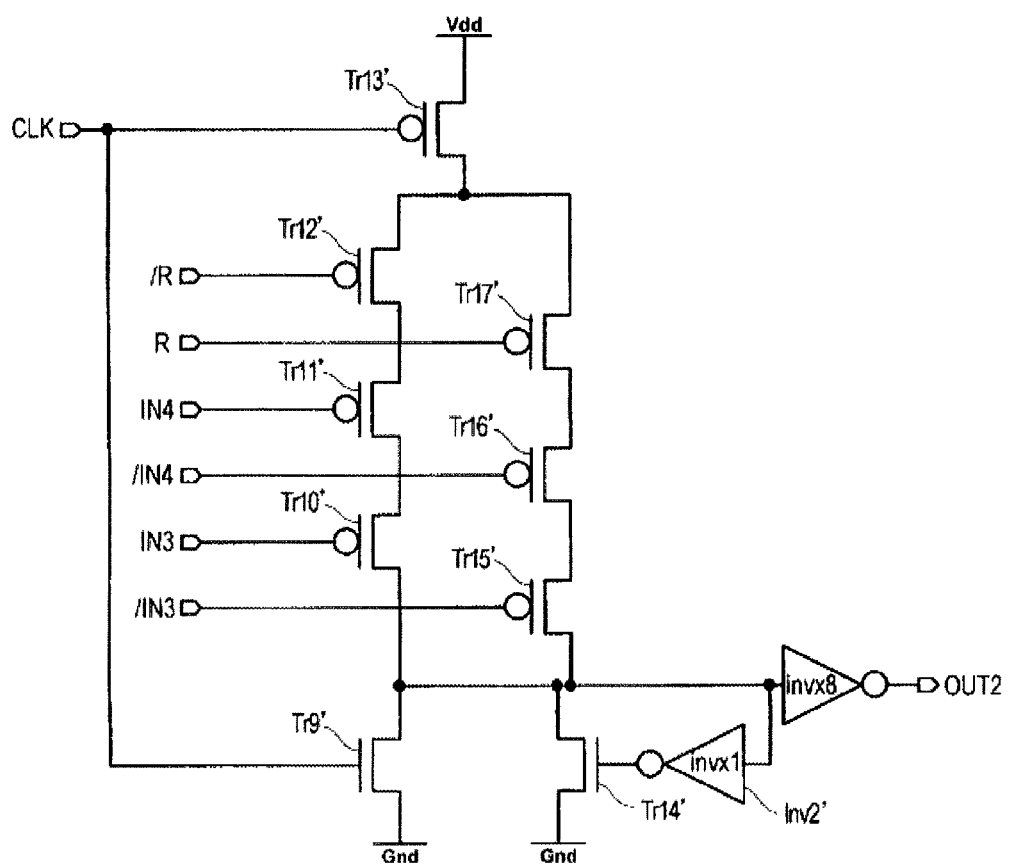
FIG. 24 is a circuit diagram showing an example of a domino-RSL gate that can be replaced with the domino-RSL gate in FIG. 15(b).
Figure 25:
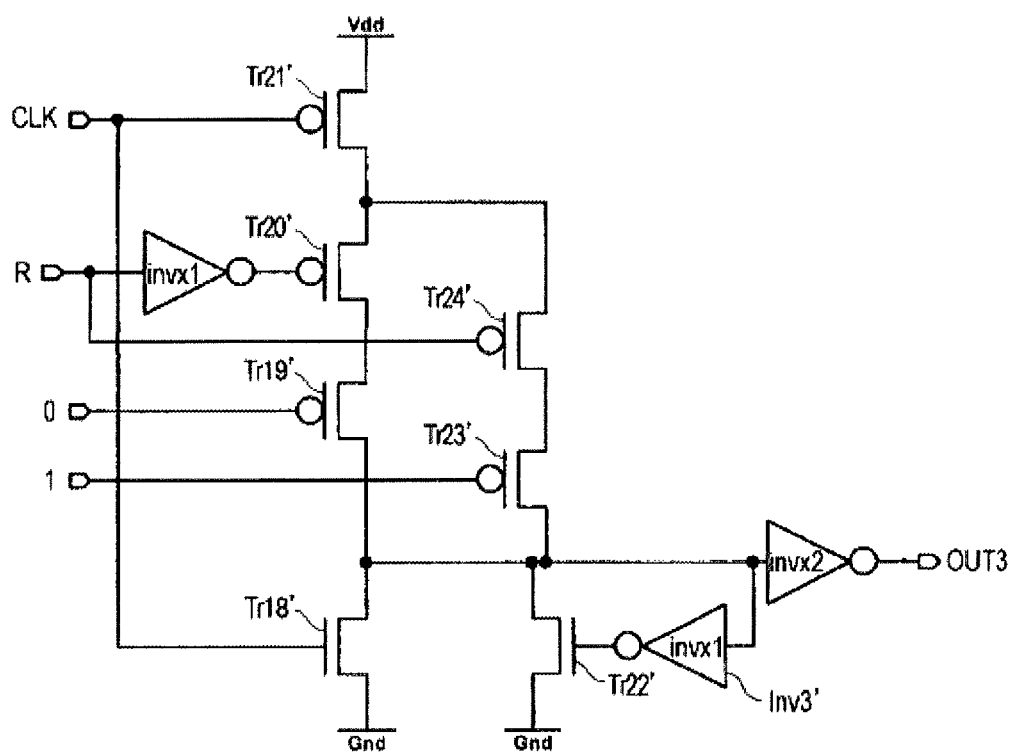
FIG. 25 is a circuit diagram showing an example of a domino-RSL multiplexer that can be replaced with the domino-RSL gate in FIG. 21(b).

FIGS. 12, 15, and 21 show examples of an address predecoder, a word line driver, and a sense amplifier circuit composed of a domino-RSL circuit; however, these components are not limited to the illustrated structures. For example, a circuit having the same function can be configured by exchanging the NMOS transistor and the PMOS transistor with each other. FIGS. 23 to 25 are circuit diagrams showing examples of a domino-RSL circuit in which the NMOS transistor and the PMOS transistor shown in FIGS. 12(b), 15(b), and 21(b) are exchanged with each other. The circuits in FIGS. 23 to 25 have inverse logic relative to the logic of the circuits in FIGS. 12(b), 15(b), and 21(b), but have the same functions as those of the circuits in (b) of FIGS. 12, 15, and 21; thus, these circuits can be replaced with the circuits in FIGS. 12(b), 15(b), and 21(b). The components (transistors, etc.) in FIGS. 23 to 25 have reference characters with an apostrophe (') in addition to the reference characters of the corresponding components in FIGS. 12(b), 15(b), and 21(b).

In addition, although the above components are configured using the domino-RSL circuit in the described examples, they may also be configured without a domino-RSL circuit, except for the memory array and the input/output driver, insofar as they are capable of equalizing transition probabilities of signal lines by using a random number.

Random-Number Generation Circuit

The random number R may be generated by using a publicly known random-number generation circuit. However, in order to further improve tamper resistance, it is desirable to use the following random-number generation circuit.

Figure 26:
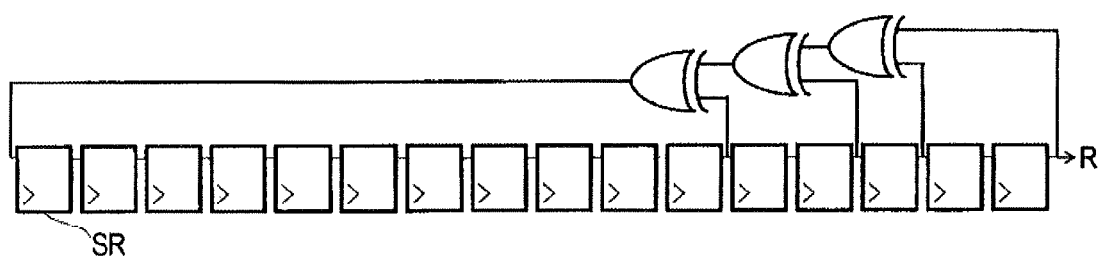
FIG. 26 is a circuit diagram showing a hitherto-known pseudo-random-number generator.

The most commonly used random-number generation circuit is a linear feedback shift resister (LFSR) pseudo-random-number generator shown in FIG. 26. This random-number generator is composed of 16 shift resisters SR and three EXOR gates. The operation of this type of random-number generator is publicly known, and thus a description is omitted. The linear feedback shift resister pseudo-random-number generator (16-bit LFSR) shown in FIG. 26 generates identical data rows in which 1 cycle has 65,535 data rows. The data rows are generated as a random-number sequence identical in all chips, as long the 16-bit data has the same initial value. In the unlikely event that a cryptographic circuit having the same design is somehow examined and the information of the random-number generation circuit of the secure memory has been stolen, there is a possibility that the power consumption value will be modified based on the random-number value to be used for DPA attack.

Figure 27:
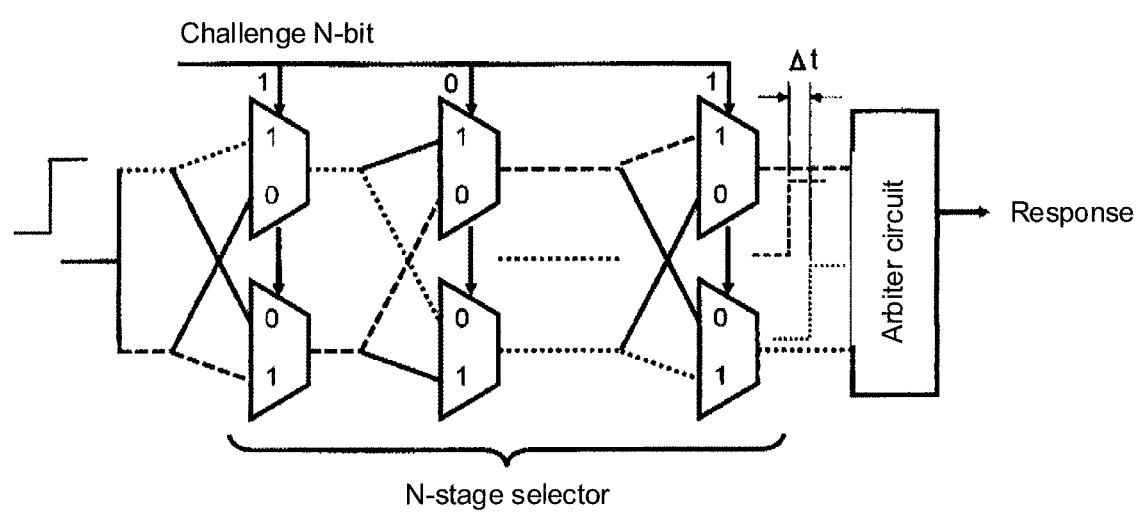
FIG. 27 is a block diagram showing a PUF circuit using manufacturing variation of a chip.

In order to invalidate such a DPA attack using assumed pseudo-random-number data, it is desirable to use a circuit capable of generating a different random number for each chip in the same circuit. FIG. 27 shows a circuit called a PUF (physically unclonable function) circuit, which is configured based on performance variations of transistors that occur during chip manufacturing. The principle of this circuit is disclosed in the aforementioned Non-patent Literature 5 (Jae W. Lee et al. "A Technique to Build a Secret Key in Integrated Circuits for Identification and Authentication Applications", 2004 Symposium on VLSI Circuits, pp. 176-179). The circuit has an N-stage selector circuit in double cascade connection. In the selector circuit, a rising-edge signal is transmitted through two types of paths in accordance with a challenge (selection signal) externally supplied. Although omitted in FIG. 27, each challenge bit signal is separately supplied to two corresponding selectors on the upper and lower sides of the circuit. Therefore, signals propagated to the end without interruption pass through two separate paths. The signals in these two types of paths are supposed to be output with the same timing; however, due to the manufacture variation among the multiple transistors constituting the selectors, an arrival time difference $\Delta t$ occurs. The arbiter circuit detects the arrival time difference of the rising-edge, outputs data 1 as a response if the output signal on the upper side arrives earlier ($\Delta t>0$), and outputs data 0 as a response if the output signal on the lower side arrives earlier ($\Delta t<0$). The output of the arbiter circuit randomly changes according to the manufacturing variations by selectively switching between the upper side and the lower side paths according to a change in the input value of a multiplexer.

Figure 28:
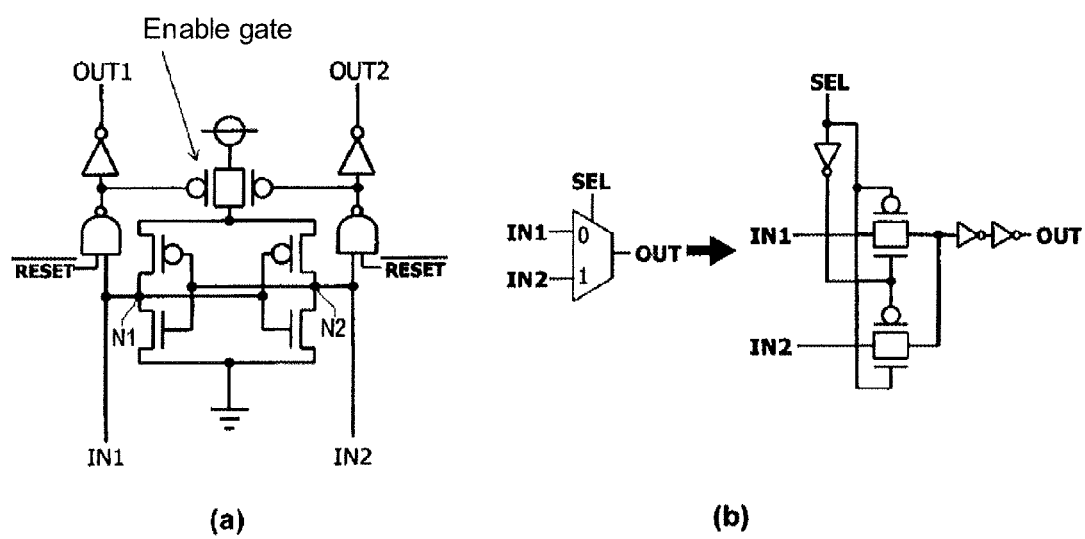
FIG. 28 is a circuit diagram showing an example of an arbiter circuit and a selector.

Although the arbiter circuit is an important circuit for detecting a minute time difference, Non-patent Literature 5 does not disclose an internal circuit. In the present invention, for example, a circuit shown in FIG. 28(a) is employed. The initial state is /RESET=0, and thus an enable gate (a gate formed by connecting the sources of two transistors to each other and connecting the drains of the two transistors to each other) located between a cross-coupled sense amplifier and a power supply is in an OFF state. In a state of /RESET=1, Hi data is supplied to either IN1 or IN2, and the enable gate is turned ON. In response to this, the cross-coupled sense amplifier is brought into operation and detects a potential difference between IN1 and IN2 (a potential difference between sensing nodes N1 and N2). Thus, an OUT terminal on the side on which the rising edge arrives earlier is set to 1, and an OUT terminal on the opposite side is set to 0. This circuit serving as an arbiter circuit is characterized in that the sense amplifier is brought into operation by the rising edge on the earlier-arrival side as a trigger signal. As the output (response) of the arbiter circuit, either OUT1 or OUT2 in FIG. 28(a) is used. The circuit in FIG. 28(a) may be configured without inverters. However, it is preferable to minimize the capacitive load on the gate node of the PMOS, because it is desirable to activate the sense amplifier as soon as possible after either IN1 or IN2 is set to Hi. Therefore, it is desirable to output external outputs OUT1 and OUT2 via the inverters.

Figure 29:
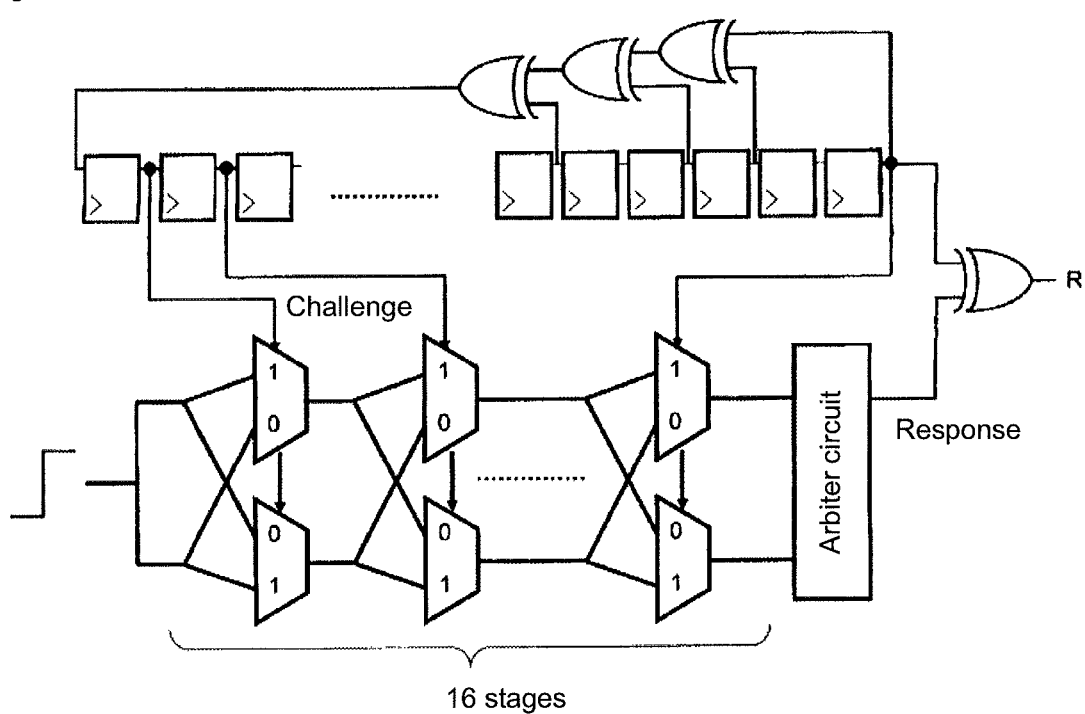
FIG. 29 is a circuit diagram showing a random-number generation circuit according to an embodiment of the present invention.

An example of a circuit capable of generating a different random number for each chip by the use of such a PUF circuit is shown in FIG. 29. This PUF circuit (the same as in FIG. 27) is configured by connecting 16 stages of selector circuits (32 selector circuits) and is arranged such that outputs of shift resisters constituting a 16-bit LFSR pseudo-random-number generation circuit are supplied as a challenge to the PUF circuit. In the circuit, an exclusive-OR operation is performed using a resulting response of the PUF circuit and the output of the LFSR pseudo-random-number generation circuit, and the calculation result is set as the random number R used in the secure memory. Reflecting the fact that the LFSR pseudo-random-number generation circuit outputs nearly the same number of 1s and 0s, nearly the same number of 1s and 0s are assigned to the random number R. This eliminates bias in the power consumption and enables individualization of the outputs of the PUF circuit for each chip.

As described above, a DPA attack in which regular pseudo-random-number data is inferred can be invalidated by using the random-number generation circuit according to the present invention, which uses the manufacture variation of each chip. When the circuit is designed such that the 1/0 occurrence of the output of PUF is 50%, the output of PUF may be used directly as a random number R. The 1/0 occurrence of PUF is likely to be biased depending on the layout (parasitic capacitance of a node) of the arbiter circuit; however, setting the 1/0 occurrence to 50% can be done by providing an additional circuit for tuning in the circuit in FIG. 28(*a*).

The application of the random-number generation circuit described above is not limited to a cryptographic circuit; the random-number generation circuit can also be used for various LSI applications requiring a random number with maximum possible irregularity (such as Monte Carlo simulation).

The present invention provides a tamper-resistant integrated memory circuit resistant to DPA attacks, in particular, a tamper-resistant integrated memory circuit that can solve the problems in the ASIC design flow involving the domino-RSL gate, thereby allowing simple design of an integrated circuit. The present invention also provides a cryptographic circuit (e.g., a cryptographic circuit on which an S-box is LSI-mounted) using the tamper-resistant integrated memory circuit as a secure memory.

DESCRIPTION OF THE REFERENCE CHARACTERS

Tr1 to Tr24, Tr1' to Tr24': transistor
Inv1 to Inv3, Inv1' to Inv3': inverter
BL, /BL: bit line
W: word line
OUT1 to OUT3, DOUT: output terminal (output signal)
A[0] to A[5]: address data
a[0] to a[3], /a[0] to /a[3], b[0] to b[3], /b[0] to /b[3]: predecode signal
CLK: clock
R, r: random number

The invention claimed is:

1. An integrated memory circuit, comprising:
a memory cell array;
a row decoder;
a column decoder;
a sense amplifier; and
an input/output driver,
the integrated memory circuit further comprising
two complementary bit lines for performing data reading from and data writing to memory cells of the memory cell array; and
an input control line to which random-number data and address data are supplied,
wherein:
a result of an exclusive-OR operation of the random-number data and address data is supplied to the row decoder and the column decoder as the address data,
a result of an exclusive-OR operation of the random-number data and the address data is converted into a word decode signal in the row decoder, a result of an exclusive-OR operation of the random-number data and the address data is converted into a column decode signal in the column decoder,
the memory cell array is accessed by the word decode signal and the column decode signal, and data of the memory cell thus accessed is transmitted to the sense amplifier via the two complementary bit lines, and
the sense amplifier carries out an exclusive-OR operation of the data of the memory cell thus accessed and the random-number data and the input/output driver outputs the operation result as data of the memory cell.

2. The integrated memory circuit according to claim 1, wherein each of the row decoder, the column decoder, and the sense amplifier comprises a domino-RSL circuit.

3. The integrated memory circuit according to claim 2, wherein:
the row decoder comprises a first predecoder and a word line driver for driving word lines of the memory cells;
the first predecoder comprises a plurality of first inverters for inverting a part of multiple-bit data that constitutes address data, and a plurality of first domino-RSL gates;
the first domino-RSL gates comprise first to eighth transistors and a second inverter;
the first and fifth transistors are PMOS transistors;
the second to fourth and sixth to eighth transistors are NMOS transistors;
the first to fourth transistors are sequentially connected in series by connecting their sources or drains;
a power-supply voltage is applied to a source of the first transistor disposed at one end of the first to fourth transistors, which are connected in series;
a ground voltage is applied to a source of the fourth transistor disposed at the other end of the first to fourth transistors, which are connected in series;
a clock signal is supplied to each gate of the first and fourth transistors;
a power-supply voltage is applied to a source of the fifth transistor;
the sixth and seventh transistors are connected in parallel;
a drain of the fifth transistor is connected to one of the connection nodes of the sixth and seventh transistors;
a drain of the eighth transistor is connected to the other connection node of the sixth and seventh transistors;
a source of the eighth transistor is connected to a connection node of the third and fourth transistors;
a connection node of the first and second transistors is connected to a connection node of the fifth to seventh transistors, forming a first output node;
the first output node is connected to a gate of the fifth transistor via the second inverter, and 1-bit data that constitutes the address data, or output data from the first inverters, is supplied to each gate of the second and sixth transistors;
1-bit data that constitutes the address data, or output data from the first inverters, which is different from the data supplied to the gates of the second and sixth transistors, is supplied to each gate of the third and seventh transistors; and
the random-number data or inversion data of the random-number data is supplied to a gate of the eighth transistor.

4. The integrated memory circuit according to claim 3, wherein:
the word line driver comprises a plurality of second domino-RSL gates;
the second domino-RSL gates comprise 9th to 17th transistors and a third inverter;
the 9th and 14th transistors are PMOS transistors;

the 10th to 13th transistors and 15th to 17th transistors are NMOS transistors;
the 9th to 13th transistors are sequentially connected in series by connecting their sources or drains;
a power-supply voltage is applied to a source of the 9th transistor disposed at one end of the 9th to 13th transistors, which are connected in series;
a ground voltage is applied to a source of the 13th transistor disposed at the other end of the 9th to 13th transistors, which are connected in series;
a clock signal is supplied to each gate of the 9th and 13th transistors;
the 14th to 17th transistors are sequentially connected in series by connecting their sources or drains;
a power-supply voltage is applied to a source of the 14th transistor disposed at one end of the 14th to 17th transistors, which are connected in series;
a source of the 17th transistor disposed at the other end of the 14th to 17th transistors, which are connected in series, is connected to a drain of the 13th transistor;
a connection node of the 9th and 10th transistors is connected to a connection node of the 14th and 15th transistors, forming a second output node;
the second output node is connected to a gate of the 14th transistor via the third inverter;
output signals of the first domino-RSL gates are supplied to each gate of the 10th and 11th transistors with no repetition;
an inversion signal of a signal supplied to the gate of the 10th transistor is supplied to a gate of the 15th transistor;
an inversion signal of a signal supplied to the gate of the 11th transistor is supplied to a gate of the 16th transistor; and
the random-number data or inversion data of the random-number data is supplied to each of the 12th and 17th transistors with no repetition.

5. The integrated memory circuit according to claim 3, wherein:
the word line driver comprises a plurality of second domino-RSL gates;
the second domino-RSL gates comprise 9th to 17th transistor and a third inverter;
the 9th and 14th transistors are NMOS transistors;
the 10th to 13th transistors and 15th to 17th transistors are PMOS transistors;
the 9th to 13th transistors are sequentially connected in series by connecting their sources or drains;
a ground voltage is applied to a source of the 9th transistor disposed at one end of the 9th to 13th transistors, which are connected in series;
a power-supply voltage is applied to a source of the 13th transistor disposed at the other end of the 9th to 13th transistors, which are connected in series;
a clock signal is supplied to each gate of the 9th and 13th transistors;
the 14th to 17th transistors are sequentially connected in series by connecting their sources or drains;
a ground voltage is applied to a source of the 14th transistor disposed at one end of the 14th to 17th transistors, which are connected in series;
a source of the 17th transistor disposed at the other end of the 14th to 17th transistors, which are connected in series, is connected to a drain of the 13th transistor;
a connection node of the 9th and 10th transistors is connected to a connection node of the 14th and 15th transistors, forming a second output node;
the second output node is connected to a gate of the 14th transistor via the third inverter;
output signals of the first domino-RSL gates are supplied to each gate of the 10th and 11th transistors with no repetition;
an inversion signal of a signal supplied to the gate of the 10th transistor is supplied to a gate of the 15th transistor;
an inversion signal of a signal supplied to the gate of the 11th transistor is supplied to a gate of the 16th transistor; and
the random-number data or inversion data of the random-number data is supplied to each of the 12th and 17th transistors with no repetition.

6. The integrated memory circuit according to claim 3, wherein:
the sense amplifier comprises a bit line precharge unit and a cross-coupled sense amplifier unit connected to the complementary bit lines, and comprises a domino-RSL multiplexer;
the domino-RSL multiplexer comprises 18th to 24th transistors and a fourth inverter;
the 18th and 22nd transistors are PMOS transistors;
the 19th to 21st transistors, and the 23rd and 24th transistors are NMOS transistors;
the 18th to 21st transistors are sequentially connected in series by connecting their sources or drains;
a power-supply voltage is applied to a source of the 18th transistor disposed at one end of the 18th to 21st transistors, which are connected in series;
a ground voltage is applied to a source of the 21st transistor disposed at the other end of the 18th to 21st transistors, which are connected in series;
a clock signal is supplied to each gate of the 18th and 21st transistors;
the 22nd to 24th transistors are sequentially connected in series by connecting their sources or drains;
a power-supply voltage is applied to a source of the 22nd transistor disposed at one end of the 22nd to 24th transistors, which are connected in series;
a source of the 24th transistor disposed at the other end of the 22nd to 24th transistors, which are connected in series, is connected to a drain of the 21st transistor;
a connection node of the 18th and 19th transistors is connected to a connection node of the 22nd and 23rd transistors, forming a third output node;
the third output node is connected to a gate of the 22nd transistor via the fourth inverter;
signals from the complementary bit lines are supplied to each gate of the 19th and 23rd transistors with no repetition; and
the random-number data or inversion data of the random-number data is supplied to each gate of the 20th and 24th transistors.

7. The integrated memory circuit according to claim 3, wherein:
the sense amplifier comprises a bit line precharge unit and a cross-coupled sense amplifier unit connected to the complementary bit lines, and comprises a domino-RSL multiplexer;
the domino-RSL multiplexer comprises 18th to 24th transistors and a fourth inverter;
the 18th and 22nd transistors are NMOS transistors;
the 19th to 21st transistors, and the 23rd and 24th transistors are PMOS transistors;
the 18th to 21st transistors are sequentially connected in series by connecting their sources or drains;

a ground voltage is applied to a source of the 18th transistor disposed at one end of the 18th to 21st transistors, which are connected in series;

a power-supply voltage is applied to a source of the 21st transistor disposed at the other end of the 18th to 21st transistors, which are connected in series;

a clock signal is supplied to each gate of the 18th and 21st transistors;

the 22nd to 24th transistors are sequentially connected in series by connecting their sources or drains;

a ground voltage is applied to a source of the 22nd transistor disposed at one end of the 22nd to 24th transistors, which are connected in series;

a source of the 24th transistor disposed at the other end of the 22nd to 24th transistors, which are connected in series, is connected to a drain of the 21st transistor;

a connection node of the 18th and 19th transistors is connected to a connection node of the 22nd and 23rd transistors, forming a third output node;

the third output node is connected to a gate of the 22nd transistor via the fourth inverter;

signals from the complementary bit lines are supplied to each gate of the 19th and 23rd transistors with no repetition; and the random-number data or inversion data of the random-number data is supplied to each gate of the 20th and 24th transistors.

8. The integrated memory circuit according to claim 3, wherein:

the column decoder comprises a second predecoder, and a column decode line driver for driving column decode lines of the memory cells;

the second predecoder comprises a fifth inverter for inverting a part of bit data that is not supplied to the first predecoder, among the multiple-bit data constituting the address data, and a third domino-RSL gate;

the third domino-RSL gates comprises 25th to 32nd transistors and a sixth inverter;

the 25th and 29th transistors are PMOS transistors;

the 26th to 28th transistors and 30th to 32nd transistors are NMOS transistors;

the 25th to 32nd transistors are sequentially connected in series by connecting their sources or drains;

a power-supply voltage is applied to a source of the 25th transistor disposed at one end of the 25th to 28th transistors, which are connected in series;

a ground voltage is applied to a source of the 28th transistor disposed at the other end of the 25th to 28th transistors, which are connected in series;

a clock signal is supplied to each gate of the 25th and 28th transistors;

a power-supply voltage is applied to a source of the 29th transistor;

the 30th and 31st transistors are connected in parallel;

a drain of the 29th transistor is connected to one of the connection nodes of the 30th and 31st transistors;

a drain of the 32nd transistor is connected to the other connection node of the 30th and 31st transistors;

a source of the 32nd transistor is connected to a connection node of the 27th and 28th transistors;

a connection node of the 25th and 26th transistors is connected to a connection node of the 29th to 31st transistors, forming a fourth output node;

the fourth output node is connected to a gate of the 29th transistor via the sixth inverter;

1-bit data that is not supplied to the first predecoder, among the bit data constituting the address data, or output data of the fifth inverter is supplied to each gate of the 26th and 30th transistors;

1-bit data that is not supplied to the first predecoder, among the bit data constituting the address data, or output data of the fifth inverter, which is different from the data supplied to the gates of the 26th and 30th transistors, is supplied to each gate of the 27th and 31st transistors; and the random-number data or inversion data of the random-number data is supplied to a gate of the 32nd transistor.

9. The integrated memory circuit according to claim 8, wherein:

the column decode line driver comprises a fourth domino-RSL gate;

the fourth domino-RSL gate comprises 33rd to 41st transistors and a seventh inverter;

the 33rd and 38th transistors are PMOS transistors;

the 34th to 37th and the 39th to 41st transistors are NMOS transistors;

the 33rd to 37th transistors are sequentially connected in series by connecting their sources or drains;

a power-supply voltage is applied to a source of the 33rd transistor disposed at one end of the 33rd to 37th transistors, which are connected in series;

a ground voltage is applied to a source of the 37th transistor disposed at the other end of the 33rd to 37th transistors, which are connected in series;

a clock signal is supplied to each gate of the 33rd and the 37th transistors;

the 38th to 41st transistors are sequentially connected in series by connecting their sources or drains;

a power-supply voltage is applied to a source of the 38th transistor disposed at one end of the 38th to 41st transistors, which are connected in series;

a source of the 41st transistor disposed at the other end of the 38th to 41st transistors, which are connected in series, is connected to a drain of the 37th transistor;

a connection node of the 33rd and 34th transistors is connected to a connection node of the 38th and 39th transistors, forming a fifth output node;

the fifth output node is connected to a gate of the 38th transistor via the seventh inverter;

an output signal of the third domino-RSL gate is supplied to a gate of the 34th or 35th transistors with no repetition;

an inversion signal of a signal supplied to the gate of the 34th transistor is supplied to a gate of the 39th transistor;

an inversion signal of a signal supplied to the gate of the 35th transistor is supplied to a gate of the 40th transistor; and the random-number data or inversion data of the random-number data is supplied to each of the 36th and 41st transistors with no repetition.

10. The integrated memory circuit according to claim 8, wherein:

the column decode line driver comprises a fourth domino-RSL gate;

the fourth domino-RSL gate comprises 33rd to 41st transistors and a seventh inverter;

the 33rd and 38th transistors are NMOS transistors;

the 34th to 37th transistors and the 39th to 41st transistors are PMOS transistors;

the 33rd to 37th transistors are sequentially connected in series by connecting their sources or drains;

a ground voltage is applied to a source of the 33rd transistor disposed at one end of the 33rd to 37th transistors, which are connected in series;

a power-supply voltage is applied to a source of the 37th transistor disposed at the other end of the 33rd to 37th transistors, which are connected in series;

a clock signal is supplied to each gate of the 33rd and 37th transistors;

the 38th to 41st transistors are sequentially connected in series by connecting their sources or drains;

a ground voltage is applied to a source of the 38th transistor disposed at one end of the 38th to 41st transistors, which are connected in series;

a source of the 41st transistor disposed at the other end of the 38th to 41st transistors, which are connected in series, is connected to a drain of the 37th transistor;

a connection node of the 33rd and 34th transistors is connected to a connection node of the 38th and 39th transistors, forming a fifth output node;

the fifth output node is connected to a gate of the 38th transistor via the seventh inverter;

an output signal of the third domino-RSL gate is supplied to a gate of the 34th or 35th transistors with no repetition;

an inversion signal of a signal supplied to the gate of the 34th transistor is supplied to a gate of the 39th transistor;

an inversion signal of a signal supplied to the gate of the 35th transistor is supplied to a gate of the 40th transistor; and the random-number data or inversion data of the random-number data is supplied to each of the 36th and 41st transistors with no repetition.

11. The integrated memory circuit according to claim 3, wherein:

the column decoder comprises a second predecoder, and a column decode line driver for driving column decode lines of the memory cells;

the second predecoder comprises a fifth inverter for inverting a part of bit data that is not supplied to the first predecoder, among the bit data constituting the address data, and comprises a third domino-RSL gate;

the third domino-RSL gate comprises 25th to 32nd transistors and a sixth inverter;

the 25th and 29th transistors are NMOS transistors;

the 26th to 28th transistors and 30th to 32nd transistors are PMOS transistors;

the 25th to 32nd transistors are sequentially connected in series by connecting their sources or drains;

a ground voltage is applied to a source of the 25th transistor disposed at one end of the 25th to 28th transistors, which are connected in series;

a power-supply voltage is applied to a source of the 28th transistor disposed at the other end of the 25th to 28th transistors, which are connected in series;

a clock signal is supplied to each gate of the 25th and 28th transistors;

a ground voltage is applied to a source of the 29th transistor;

the 30th and 31st transistors are connected in parallel;

a drain of the 29th transistor is connected to one of the connection nodes of the 30th and 31st transistors;

a drain of the 32nd transistor is connected to the other connection node of the 30th and 31st transistors;

a source of the 32nd transistor is connected to a connection node of the 27th and 28th transistors;

a connection node of the 25th and 26th transistors is connected to a connection node of the 29th to 31st transistors, forming a fourth output node;

the fourth output node is connected to a gate of the 29th transistor via the sixth inverter;

1-bit data that is not supplied to the first predecoder, among the bit data constituting the address data, or output data of the fifth inverter, is supplied to each gate of the 26th and 30th transistors;

1-bit data that is not supplied to the first predecoder, among the bit data constituting the address data, or output data of the fifth inverter, which is different from the data supplied to the gates of the 26th and 30th transistors, is supplied to each gate of the 27th and 31st transistors; and the random-number data or inversion data of the random-number data is supplied to a gate of the 32nd transistor.

12. The integrated memory circuit according to claim 2, wherein:

the row decoder comprises a first predecoder, and a word line driver for driving word lines of the memory cells;

the first predecoder comprises a plurality of first inverters for inverting a part of multiple-bit data that constitutes address data, and a plurality of first domino-RSL gates;

the first domino-RSL gates comprise first to eighth transistors and a second inverter;

the first and fifth transistors are NMOS transistors;

the second to fourth transistors and the sixth to eighth transistors are PMOS transistors;

the first to fourth transistors are sequentially connected in series by connecting their sources or drains;

a ground voltage is applied to a source of the first transistor disposed at one end of the first to fourth transistors, which are connected in series;

a power-supply voltage is applied to a source of the fourth transistor disposed at the other end of the first to fourth transistors, which are connected in series;

a clock signal is supplied to each gate of the first transistor and the fourth transistor;

a ground voltage is applied to a source of the fifth transistor;

the sixth and seventh transistors are connected in parallel;

a drain of the fifth transistor is connected to one of the connection nodes of the sixth and seventh transistors;

a drain of the eighth transistor is connected to the other connection node of the sixth and seventh transistors;

a source of the eighth transistor is connected to a connection node of the third and fourth transistors;

a connection node of the first and second transistors is connected to a connection node of the fifth to seventh transistors, forming a first output node;

the first output node is connected to a gate of the fifth transistor via the second inverter;

1-bit data that constitutes the address data, or output data from the first inverters, is supplied to each gate of the second and sixth transistors;

1-bit data that constitutes the address data, or output data from the first inverters, which is different from the data supplied to the gates of the second and sixth transistors, is supplied to each gate of the third and seventh transistors; and the random-number data or inversion data of the random-number data is supplied to a gate of the eighth transistor.

13. A cryptographic circuit comprising the integrated memory circuit according to claim 1.

14. A cryptographic circuit according to claim 13, wherein the cryptographic circuit is a cryptographic circuit for DES encryption or AES encryption in which an S-box comprises the integrated memory circuit.

15. A random-number generating circuit, comprising:

a linear feedback shift register;

an N-stage selector circuit in double cascade connection;

an arbiter circuit; and an arithmetic gate that performs exclusive-OR operation with respect to an output signal from the linear feedback shift register and an output signal from the arbiter circuit, thereby outputting a random number, the linear feedback shift register comprising N shift registers connected in series and a plurality of exclusive-OR operators, the arbiter circuit comprising an enable gate composed of a cross-coupled sense amplifier connected in series with and between a ground voltage and a power-supply voltage, and two transistors in which their sources are connected to each other and their drains are connected to each other;

a first NAND gate in which a first input signal is supplied to one of the input ports, the other input port is connected to a first sensing node of the cross-coupled sense amplifier, and an output port is connected to a gate of one of the transistors of the enable gate; and a second NAND gate in which a second input signal is supplied to one of the input ports, the other input port is connected to a second sensing node of the cross-coupled sense amplifier, and an output port is connected to a gate of the other transistor of the enable gate, wherein:

an output from the shift register is supplied to the selector circuit as a selection signal challenge, output signals from two final stages of the selector circuit are supplied to the arbiter circuit as the first and second input signals, and one of the outputs from the first and second NAND gates is output from the arbiter circuit as the random number.

16. A cryptographic circuit comprising:
an integrated memory circuit comprising:
a memory cell array;
a row decoder;
a column decoder;
a sense amplifier; and
an input/output driver,
the integrated memory circuit further comprising
two complementary bit lines for performing data reading from and data writing to memory cells of the memory cell array; and
an input control line to which random-number data and address data are supplied, wherein:

a result of an exclusive-OR operation of the random-number data and address data is supplied to the row decoder and the column decoder as the address data, a result of an exclusive-OR operation of the random-number data and the address data is converted into a word decode signal in the row decoder, a result of an exclusive-OR operation of the random-number data and the address data is converted into a column decode signal in the column decoder, the memory cell array is accessed by the word decode signal and the column decode signal, and data of the memory cell thus accessed is transmitted to the sense amplifier via the two complementary bit lines, and the sense amplifier carries out an exclusive-OR operation of the data of the memory cell thus accessed and the random-number data, and the input/output driver outputs the operation result as data of the memory cell, and the output from the random-number generating circuit is the random-number data supplied to the integrated memory circuit.

17. A cryptographic circuit according to claim 16, wherein the cryptographic circuit is a cryptographic circuit for DES encryption or AES encryption in which an S-box comprises the integrated memory circuit.

* * * * *